US010815909B2

(12) United States Patent
Wirth et al.

(10) Patent No.: US 10,815,909 B2
(45) Date of Patent: Oct. 27, 2020

(54) METHOD FOR VARYING A CYLINDER-SPECIFIC COMPRESSION RATIO OF AN APPLIED-IGNITION INTERNAL COMBUSTION ENGINE AND INTERNAL COMBUSTION ENGINE FOR CARRYING OUT A METHOD OF SAID TYPE

(71) Applicant: Ford Global Technologies, LLC, Dearborn, MI (US)

(72) Inventors: Martin Wirth, Remscheid (DE); Maziar Khosravi, Cologne (DE); Bernd Steiner, Bergisch Gladbach (DE); Jens Dunstheimer, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 15/950,930

(22) Filed: Apr. 11, 2018

(65) Prior Publication Data
US 2018/0320604 A1    Nov. 8, 2018

(30) Foreign Application Priority Data
May 5, 2017   (DE) .......... 10 2017 207 644

(51) Int. Cl.
*F02D 15/02*    (2006.01)
*F02D 41/00*    (2006.01)
(Continued)

(52) U.S. Cl.
CPC ............ *F02D 15/02* (2013.01); *F02B 75/045* (2013.01); *F02B 75/048* (2013.01);
(Continued)

(58) Field of Classification Search
CPC ....... F02D 15/02; F02B 75/045; F02B 75/048
See application file for complete search history.

(56) References Cited

U.S. PATENT DOCUMENTS 2,803,148 A    8/1957    Braskamp
3,059,502 A    10/1962   Munz
(Continued)

FOREIGN PATENT DOCUMENTS

DE    19703948 C1    6/1998
DE    10230428 A1    1/2004
(Continued)

OTHER PUBLICATIONS

Watanabe, S. et al., "Theoretical Analysis of Multiple Linkage System and Improvement of Thermal Efficiency," SAE Technical Paper SAE 2006-32-0101, Proceedings of the SAE International Small Engine Technology Conference and Exhibition, Nov. 13, 2006, San Antonio, Texas, 10 pages.

*Primary Examiner* — Kevin A Lathers
(74) *Attorney, Agent, or Firm* — Geoffrey Brumbaugh; McCoy Russell LLP

(57) ABSTRACT

A method for varying a compression ratio ε of an operating applied-ignition internal combustion engine having at least two cylinders and having a crank mechanism (1) comprising a crankshaft (2) which is mounted in a crankcase and which rotates at a crankshaft rotational speed $\Omega_{crankshaft}$, is described. The method includes increasing an expansion phase of a cylinder cycle via rotation of the eccentric bushing (4).

9 Claims, 8 Drawing Sheets

(51) Int. Cl.
*F16C 3/28* (2006.01)
*F02B 75/04* (2006.01)
*F16C 3/06* (2006.01)
*F16C 7/06* (2006.01)
*F16C 9/06* (2006.01)
*F16C 23/10* (2006.01)

(52) U.S. Cl.
CPC ......... *F02D 41/005* (2013.01); *F02D 41/008* (2013.01); *F16C 3/06* (2013.01); *F16C 3/28* (2013.01); *F16C 7/06* (2013.01); *F16C 9/06* (2013.01); *F16C 23/10* (2013.01); *F02D 41/0025* (2013.01); *F02D 2200/0611* (2013.01); *F02D 2700/03* (2013.01); *F16C 2360/22* (2013.01)

(56) References Cited

U.S. PATENT DOCUMENTS

| | | | |
|---|---|---|---|
| 3,242,768 | A | 3/1966 | Munschauer, Jr. |
| 4,236,874 | A | 12/1980 | Sisk |
| 4,245,966 | A | 1/1981 | Riffe |
| 4,718,589 | A | 1/1988 | Nelson |
| 5,076,057 | A | 12/1991 | Maruno |
| 6,386,066 | B1 | 5/2002 | Shotwell |
| 6,568,357 | B1 | 5/2003 | Rao et al. |
| 6,644,171 | B2 | 11/2003 | Styron et al. |
| 7,159,551 | B2 | 1/2007 | Cecur et al. |
| 7,404,383 | B2 | 7/2008 | Elendt |
| 7,469,663 | B1 * | 12/2008 | Berger ................. F02B 75/045 123/48 B |
| 8,074,612 | B2 | 12/2011 | Shin et al. |
| 9,249,724 | B2 | 2/2016 | Gutzer |
| 9,279,363 | B2 | 3/2016 | De Gooijer |
| 9,605,603 | B2 | 3/2017 | Glugla et al. |
| 2004/0221831 | A1 * | 11/2004 | Chmela ................ F02D 41/0007 123/301 |
| 2012/0291755 | A1 * | 11/2012 | Perez ................... F02B 75/048 123/48 B |

FOREIGN PATENT DOCUMENTS

| | | |
|---|---|---|
| EP | 0438121 A1 | 7/1991 |
| EP | 1085184 A2 | 3/2001 |
| EP | 1959112 A1 | 8/2008 |
| GB | 2167805 A | 6/1986 |
| WO | 9627079 A1 | 9/1996 |

* cited by examiner

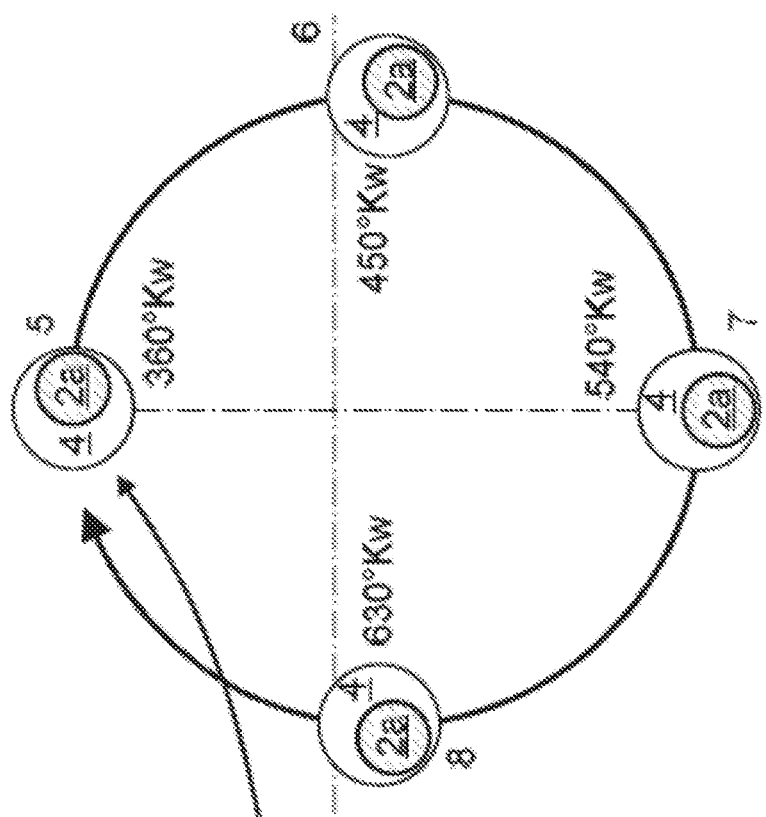
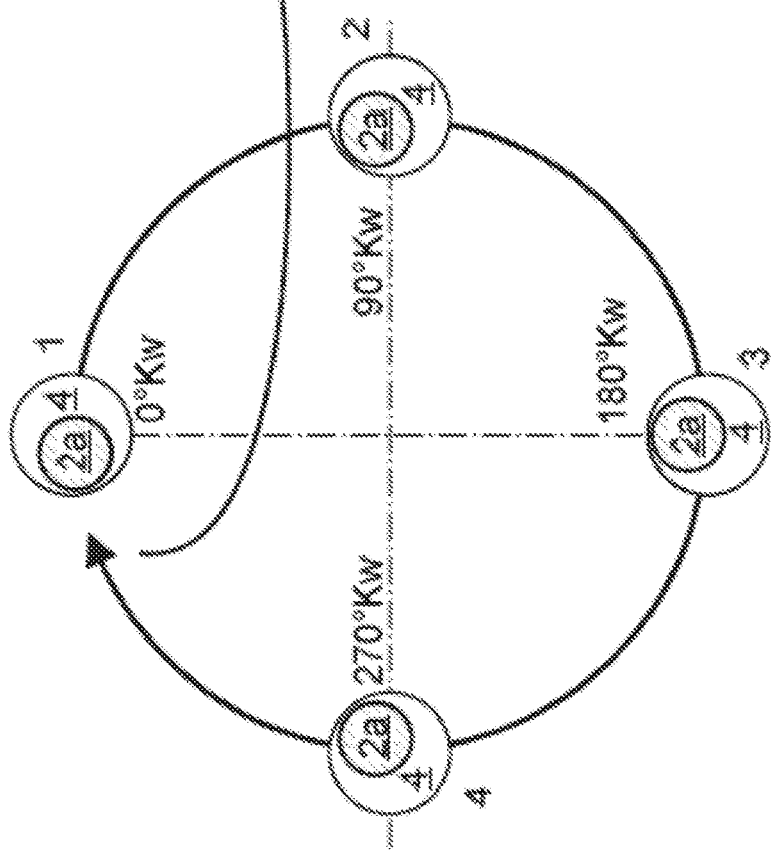
FIG. 3A
FIG. 3B

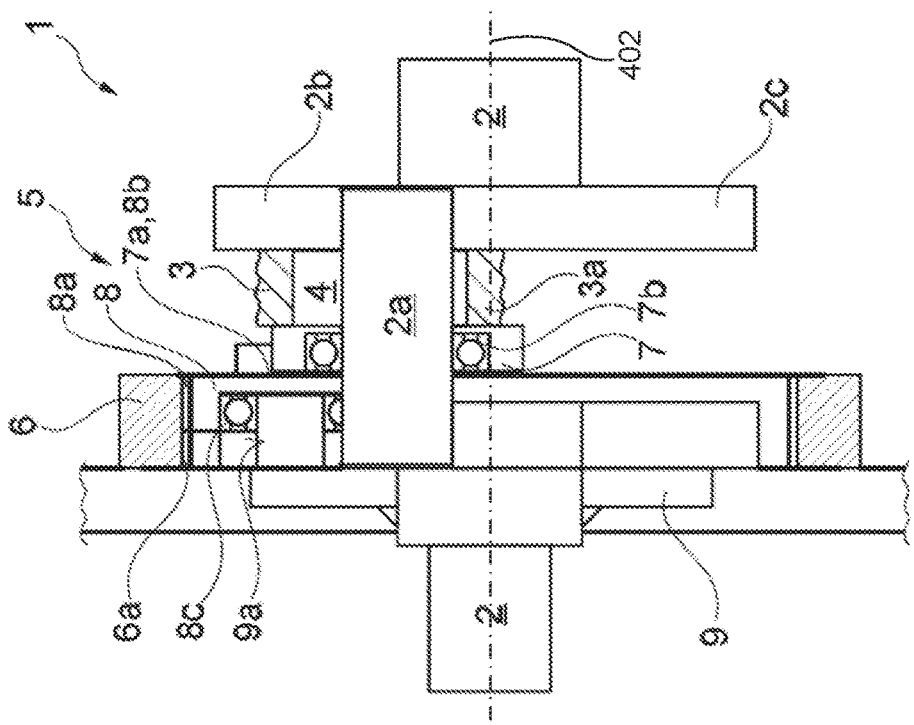
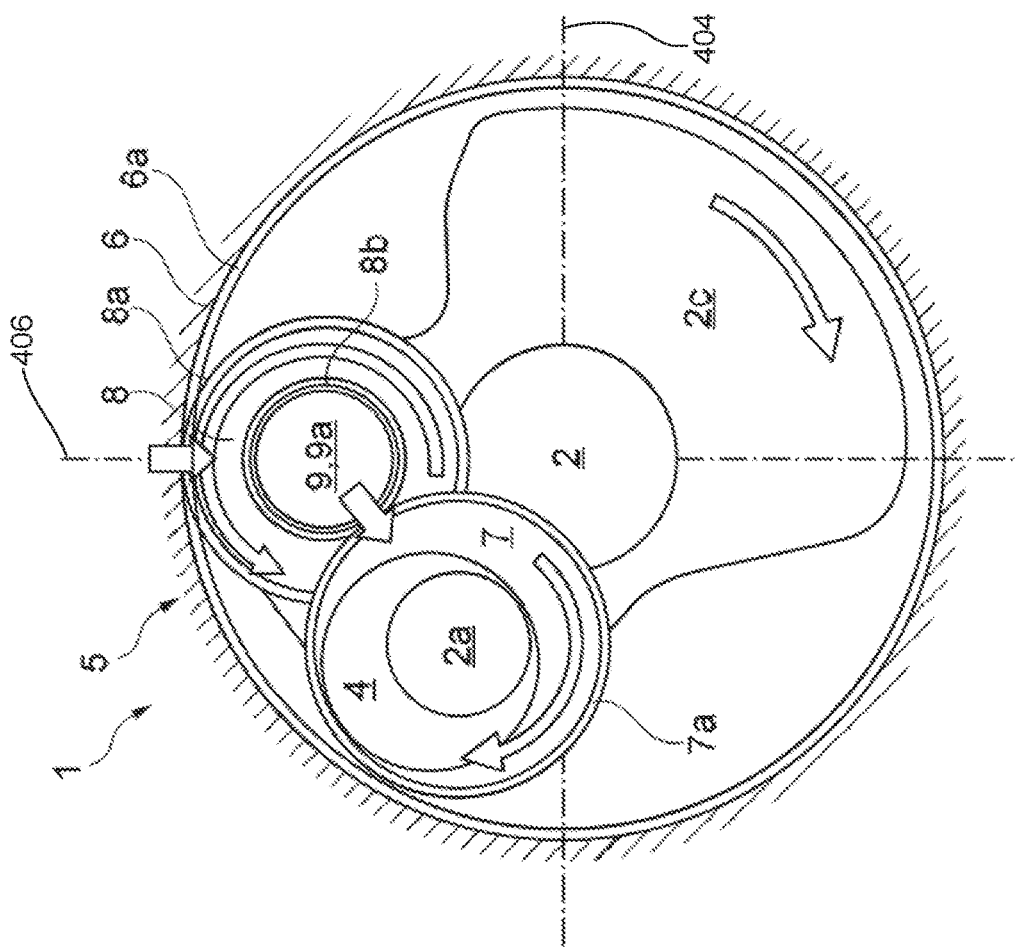

METHOD FOR VARYING A CYLINDER-SPECIFIC COMPRESSION RATIO OF AN APPLIED-IGNITION INTERNAL COMBUSTION ENGINE AND INTERNAL COMBUSTION ENGINE FOR CARRYING OUT A METHOD OF SAID TYPE

CROSS REFERENCE TO RELATED APPLICATION

This application claims priority to German Patent Application No. 102017207644.5, filed May 5, 2017. The entire contents of the above-referenced application are hereby incorporated by reference in its entirety for all purposes.

BACKGROUND/SUMMARY

An engine may be equipped with a connecting rod with a small connecting rod eye and a large connecting rod eye. Here, the connecting rod is articulatedly connected via a piston pin arranged in the small connecting rod eye to a piston, and is rotatably mounted by means of the large connecting rod eye on a crank pin, that is to say connecting rod journal of the crankshaft, of a so-called crankshaft throw. The piston serves to transmit the gas forces generated by the combustion to the crankshaft. The gas forces to which the piston is subjected are thus transmitted via the piston pin to the connecting rod and by the latter to the crankshaft. By means of the described arrangement of piston, piston pin, connecting rod and crankshaft, the oscillating movement of the piston is transformed into a rotational movement of the crankshaft. Here, aside from a small rotational component, the connecting rod moves predominantly in an oscillating fashion in the direction of the cylinder longitudinal axis.

The gas forces force the piston downward in the direction of the cylinder longitudinal axis, wherein, proceeding from the top dead center TDC, the piston is forced to perform an accelerated movement by the gas forces. The piston which seeks to give way to the gas forces by its downwardly directed movement must, during said downwardly directed movement, drive the connecting rod which is articulatedly connected thereto. For this purpose, the piston conducts the gas forces acting on it to the connecting rod via the piston pin, and seeks to accelerate said connecting rod downward. When the piston nears the bottom dead center BDC, it is decelerated together with the connecting rod before then performing a movement reversal at the bottom dead center BDC. The distance covered by the piston on its path between top dead center TDC and bottom dead center BDC is referred to as piston stroke s.

The swept volume $V_h$ of a cylinder is defined, in terms of the piston surface area $A_K$ and the piston stroke s, as: $V_h = A_K \cdot s$. The cylinder volume when the piston is at top dead center TDC is referred to as the compression volume $V_c$. The cylinder volume when the piston is at bottom dead center BDC is calculated from the sum of swept volume $V_h$ and compression volume $V_c$.

For the geometrical compression ratio ε of the internal combustion engine or of the individual cylinder, the following applies:

$$\varepsilon = 1 + V_h/V_c$$

Whereas diesel engines are, out of principle, operated with very high compression ratios in order to ensure auto-ignition of the fuel-air mixture, it is the case in Otto-cycle engines that the maximum admissible compression ratio $\varepsilon_{max}$ should, owing to the knocking tendency in full-load operation, that is to say the tendency for spontaneous ignitions to occur in the still-unburned mixture, be limited to relatively low compression ratios of for example ε≈10 in the case of naturally aspirated engines. In the case of supercharged engines, which are becoming increasingly important, the geometric compression ratio must be lowered further, for example it may be limited to ε≈8 . . . 9, for knock-free combustion.

The relatively low compression ratios of the Otto-cycle engine are disadvantageous in particular with regard to fuel consumption, that is to say, with regard to efficiency. Basically, with decreasing compression ratio ε, the efficiency η likewise decreases. In other words, for the highest possible efficiency of the combustion process, the cylinder fresh charge should be compressed to the greatest extent possible, which, for the above-stated reasons, too, in particular the knocking tendency of the Otto-cycle engine close to full load, cannot be realized without restriction.

One design approach for resolving said conflict consists in providing the internal combustion engine with a variable compression ratio E, specifically in such a way that, with decreasing load, that is to say proceeding from full load in the direction of part load, the compression ratio ε is increased. In this way, it would be possible to at least partially compensate for a fundamental part-load-specific disadvantage of the Otto-cycle engine in relation to the diesel engine.

Owing to the fact that an internal combustion engine is operated predominantly in the part-load range, this offers great potential with regard to the attainable fuel saving. An efficiency-optimized variation or adaptation of the compression ratio ε to the respective operating point in the engine characteristic map permits, even in Otto-cycle engines in the part-load range, compression ratios of ε≈14 . . . 15 and thus a significant consumption reduction.

Numerous approaches for realizing a variable compression ratio ε in an operating internal combustion engine are known, a few of which will be presented briefly by way of example below.

One possibility for realizing a variable compression ratio ε consists in forming the connecting rod as a two-part connecting rod. Here, the connecting rod comprises an upper connecting rod, which is articulatedly connected to the piston, and a lower connecting rod, which is articulatedly connected to the crankshaft, wherein the upper connecting rod and the lower connecting rod are likewise articulatedly connected to one another, in order thereby to be able to be pivoted relative to one another. If the spacing of the two connecting rod eyes along the connecting line thereof is understood to be the connecting rod length, said length may be varied by virtue of the upper and the lower connecting rod being pivoted relative to one another, that is to say by virtue of the two-part connecting rod being folded to a greater or lesser extent.

Here, the adjustment of the compression ratio ε is realized by means of an articulation rod which is articulatedly connected to the upper connecting rod and which is received rotatably on an eccentric shaft mounted in the engine housing. By means of a rotation of the eccentric shaft and the resulting variations of the piston dead center positions, the compression ratio can be varied within wide limits, for example between $\varepsilon_{min} \approx 8$ and $\varepsilon_{max} \approx 15$.

The mechanical adjustment device is a disadvantage of the described concept, because a considerable part of the adjustment device, in particular the articulation rod, participates in the oscillating and rotating movement of the crank mechanism. The oscillating movement of the piston and of the connecting rod together with the components of the adjustment device leads to intense accelerations and decelerations, which increase with the square of the crankshaft rotational speed and correspondingly generate high dynamic inertial forces. Said dynamic inertial forces subject the crank mechanism to considerable load and play a significant role in the design of the components with regard to the strength thereof.

It is therefore a fundamental aim of the designers to keep the oscillating masses as low as possible and to design the components such that they are of the most material-saving form possible, wherein the required strength of the components sets limits on this approach. The use of a mechanical adjustment device which significantly participates in the oscillating movement thus opposes the aim of reducing the oscillating masses.

Another possibility for realizing a variable compression ratio ε consists in constructing the connecting rod from a plurality of connecting rod pieces which are arranged such that they can be slid telescopically one inside the other. Said connecting rod is likewise a connecting rod of the type mentioned in the introduction. A variation of the length of the connecting rod is realized by virtue of the connecting rod pieces being pushed together or pulled apart. For this purpose, a mechanical adjustment device is again required which, out of principle, like the adjustment device described above, must be mechanically coupled to the connecting rod, whereby a part of said adjustment device in turn participates in the oscillating and rotating movement of the crank mechanism. The disadvantages are those that have already been stated above. Furthermore, the variable-length connecting rods already lead, on their own, to an increase of the oscillating and rotating masses in relation to a conventional connecting rod, which further intensifies the described disadvantageous effects.

Also known are approaches in which an eccentric bushing as an intermediate element of the bearing arrangement is provided in the small or large connecting rod eye. The eccentric bushing is rotatable, and for example switchable in a stepped manner between different working positions, wherein the different compression ratios E result from the different dead center positions of the piston in the various working positions of the eccentric bushing.

The German laid-open specification DE 199 44 669 A1 describes a connecting rod in which an eccentric bushing is arranged in the large connecting rod eye. To lock and release the eccentric bushing, a locking element of a locking device is provided, which locking element can be placed in engagement with the bushing. The control, that is to say actuation, of the mechanical locking device comprising a cylinder and a piston movable in said cylinder may be realized hydraulically by means of pressurized oil from the engine lubricating oil circuit or by means of compressed air. A device by means of which the unlocked eccentric bushing is or can be rotated in a targeted manner into a predefinable position is not disclosed by DE 199 44 669 A1. This is a fundamental deficit of the concepts described for realizing a variable compression ratio E.

Insofar as the concepts which are characterized by the use of an eccentric bushing, said concepts generally lack devices and methods for locking and releasing the bushing. The eccentric bushing, once released, is left to its own devices, that is to say no influence is exerted on the rotational activity of the bushing itself.

Like DE 199 44 669 A1, the German laid-open specification DE 102 30 428 A1 also does not describe an adjustment device for the eccentric bushing in the actual sense, but rather describes a locking device by means of which the bushing can be fixed and released. The rotation of the released eccentric bushing itself results from the bearing reaction forces acting on the bushing, without the rotational activity being influenced, or being able to be influenced, in a targeted manner.

According to DE 102 30 428 A1, an improvement in relation to other eccentric adjustment devices, such as are described in DE 197 03 948 C1 and EP 0 438 121 A1, consists in that the re-locking of the unlocked bushing does not first take place after multiple working cycles, and the unlocked bushing does not move, that is to say rotate, in an undefined manner in the large connecting rod eye, because a blocking device proposed in DE 102 30 428 A1 permits a rotation only in one direction.

To overcome these deficiencies, the present invention relates to a method for varying a cylinder-specific compression ratio ε of an operating applied-ignition internal combustion engine having at least two cylinders and having a crank mechanism comprising a crankshaft which is mounted in a crankcase and which rotates at a crankshaft rotational speed $\Omega_{crankshaft}$, in which internal combustion engine: each cylinder has a piston which, during the course of a working cycle, moves along a piston longitudinal axis through a piston stroke s, specifically from a bottom dead center BDC to a top dead center TDC during a compression phase and from the top dead center TDC to the bottom dead center BDC during a subsequent expansion phase; the crankshaft has, for each cylinder, an associated crankshaft throw, the crankshaft throws being arranged spaced apart from one another along the longitudinal axis of the crankshaft; and for each cylinder, a connecting rod is provided which is mounted, at a large connecting rod eye, on the cylinder-specific crankshaft throw using a rotatable eccentric bushing as an intermediate element in order to realize a variable compression ratio ε. The invention also relates to an applied-ignition internal combustion engine for carrying out a method of said type.

The present description may provide several advantages. In particular, the approach allows stroke of a cylinder to change twice during an engine cycle to improve engine efficiency. In addition, the change in cylinder compression ratio may change as a function of a working cycle of the cylinder rather than simply as a function of engine speed and load. Further, the approach changes the compression ratio of a cylinder without having to add a large rotational mass to the engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 3A schematically shows the change in position of the eccentric bushing with respect to the crankshaft throw in the case of a revolving crankshaft for the expansion phase and the exhaust phase;

FIG. 3B schematically shows the change in position of the eccentric bushing with respect to the crankshaft throw in the case of a revolving crankshaft for the intake phase and the compression phase;

FIG. 4A schematically shows, in a side view and partially in section, the crank mechanism of a first embodiment of the applied-ignition internal combustion engine;

FIG. 4B shows the crank mechanism, illustrated in FIG. 3A, schematically in a side view rotated through 90° in relation to FIG. 3A and likewise partially in section;

DETAILED DESCRIPTION

Figure 1:
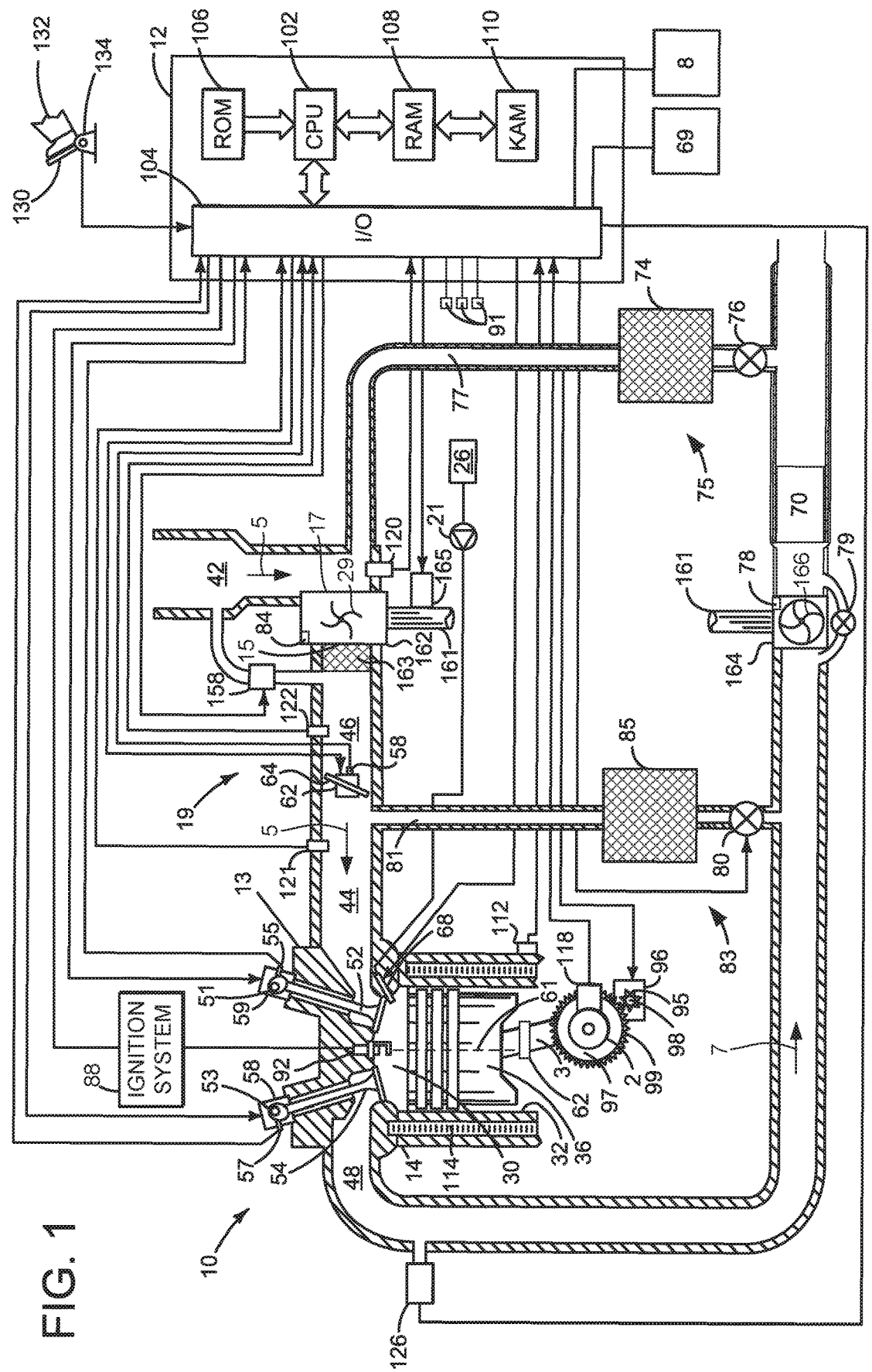
FIG. 1 shows a detailed schematic depiction of an example engine.

The present description is related to a variable compression ratio internal combustion engine. The engine may be naturally aspirated or it may be turbocharged or supercharged. FIG. 1 shows one example of a variable compression ratio engine. The engine's compression ratio may be altered twice in a cylinder cycle to improve engine efficiency. FIG. 2 shows position of a conventional piston and position of a piston according to the engine of the present invention relative to cylinder strokes. The present engine's crankshaft through is shown relative to an eccentric bushing in FIGS. 3A and 3B over a cylinder cycle to illustrate how the engine's compression ratio is changed as shown in FIG. 2. The engine's crankshaft mechanism is shown in FIGS. 4A and 4B. The figures are shown approximately to scale.

FIGS. 3A-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. FIGS. 4A and 4B are drawn to scale, although other relative dimensions may be used.

An internal combustion engine of the stated type is used as a motor vehicle drive unit. Within the context of the present invention, the expression "internal combustion engine" encompasses Otto-cycle engines but also hybrid internal combustion engines, that is to say applied-ignition internal combustion engines that are operated using a hybrid combustion process and are ignited using applied ignition, and hybrid drives which comprise not only the applied-ignition internal combustion engine but also an electric machine which can be connected in terms of drive to the internal combustion engine and which receives power from the internal combustion engine or which, as a switchable auxiliary drive, additionally outputs power.

Internal combustion engines of the stated type have a crank mechanism which comprises a crankshaft mounted in a crankcase, which crankshaft has, for each cylinder, a cylinder-specific crankshaft throw on which a cylinder-specific connecting rod is mounted. The crankshaft throws of the cylinders are arranged spaced apart from one another along the longitudinal axis of the crankshaft.

The internal combustion engine to which the present invention relates has a crank mechanism in which, for each cylinder, a connecting rod is provided which is mounted, at the large connecting rod eye, on the cylinder-specific crankshaft throw using a rotatable eccentric bushing as an intermediate element, whereby a variable cylinder-specific compression ratio $\varepsilon$ can be realized. It would be advantageous if the cylinder-specific eccentric bushings could be adjusted in targeted fashion in accordance with demand in order to be able to adapt the compression ratio $\varepsilon$ in an efficiency-optimized manner to the present operating state of the internal combustion engine or of the cylinder. Against this background, it is an object of the present invention to specify a method with which the efficiency $\eta$ of the applied-ignition internal combustion engine can be further increased. It is a further sub-object of the present invention to specify an applied-ignition internal combustion engine for carrying out a method of said type.

The first sub-object is achieved by means of a method for varying a cylinder-specific compression ratio $\varepsilon$ of an operating applied-ignition internal combustion engine having at least two cylinders and having a crank mechanism comprising a crankshaft which is mounted in a crankcase and which rotates at a crankshaft rotational speed $\Omega_{crankshaft}$, in which internal combustion engine: each cylinder has a piston which, during the course of a working cycle, moves along a piston longitudinal axis through a piston stroke s, specifically from a bottom dead center BDC to a top dead center TDC during a compression phase and from the top dead center TDC to the bottom dead center BDC during a subsequent expansion phase; the crankshaft has, for each cylinder, an associated crankshaft throw, the crankshaft throws being arranged spaced apart from one another along the longitudinal axis of the crankshaft; and for each cylinder, a connecting rod is provided which is mounted, at a large connecting rod eye, on the cylinder-specific crankshaft throw using a rotatable eccentric bushing as an intermediate element in order to realize a variable compression ratio $\varepsilon$, which method is distinguished by the fact that the compression ratio $\varepsilon$ is, during the expansion phase, increased by rotation of the eccentric bushing relative to the crankshaft throw with the top dead center TDC being maintained, the piston stroke s being increased, and as a result the bottom dead center BDC being shifted, as a result of the rotation of the eccentric bushing.

According to the invention, the compression ratio $\varepsilon$ of a cylinder is varied not in a load-dependent or operating-point-specific manner but rather within the presently occurring working cycle of the respective cylinder. The method according to the invention thus permits a more extensive adaptation of the compression ratio $\varepsilon$ to the present operating state of the individual or respective cylinder in relation to the prior art. The efficiency of the internal combustion engine can thus be further increased. The cylinder-specific eccentric bushings are adjusted in targeted fashion in accordance with demand. Accordingly, the compression ratio ε is, during the expansion phase, increased by rotation of the eccentric bushing relative to the crankshaft throw with the top dead center TDC being maintained. For this purpose, the bottom dead center BDC is, by rotation of the eccentric bushing, shifted such that the spacing to the unchanged top dead center TDC is increased, that is to say the piston stroke s increases.

This increase of the compression ratio ε during the expansion phase is a measure with which the efficiency of the internal combustion engine can be increased. The technical or thermodynamic effect of this measure according to the invention is based on the fact that the gases situated in the cylinder are, owing to the combustion that is taking place, generally under pressure even when the at least one outlet valve opens close to the bottom dead center BDC at the start of the charge exchange, this being the case despite the fact that the gases situated in the cylinder have already expanded owing to a piston moving toward the bottom dead center in the expansion phase.

When the at least one outlet valve opens for the purposes of discharging the combustion gases, the combustion gases flow at high speed through the valve-specific outlet opening into the exhaust-gas discharge system owing to the high pressure level prevailing in the cylinder at the end of the combustion and the associated high pressure difference between the combustion chamber and exhaust line. It is only during the further course of the charge exchange that the pressures in the cylinder and in the exhaust-gas discharge system equalize, such that the combustion gases are no longer evacuated primarily in a pressure-driven manner but rather are expelled as a result of the stroke movement of the piston. As a result, the high pressure in the cylinder at the start of the charge exchange remains thermodynamically unutilized. Since the energy still contained in the pressurized gases is not utilized to perform work on the piston but rather is used for the evacuation of the exhaust gases from the cylinder, this energy is lost for the internal combustion engine.

It is thermodynamically more advantageous for the pressure in the cylinder to be lowered to the greatest possible extent, that is to say for the expansion of the gases situated in the cylinder to be advanced substantially further, before the at least one outlet valve is opened. For this purpose, the lengthening of the expansion phase, that is to say the increase of the compression ratio ε in the manner according to the invention, is the suitable measure. The increase of the compression ratio ε is performed according to the invention by means of a shift of the bottom dead center and the associated increase of the piston stroke s, because, for the geometric compression ratio, the following applies: $\varepsilon = 1 + V_h/V_c$ with $V_h = A_K \cdot s$, where $A_K$ denotes the piston surface area and s denotes the piston stroke.

There are further measures with which the cylinder-specific compression ratio ε can be varied within a presently occurring working cycle in order to increase the efficiency of the internal combustion engine. These measures will be discussed in more detail in conjunction with the advantageous embodiments of the method according to the invention. With the method according to the invention, the first sub-object on which the invention is based is achieved, that is to say a method is specified with which the efficiency η of the applied-ignition internal combustion engine can be further increased. Embodiments of the method are advantageous in which the compression ratio ε is, during an exhaust phase following the expansion phase, decreased by rotation of the eccentric bushing relative to the crankshaft throw with the top dead center TDC being maintained, the piston stroke s being decreased, and as a result the bottom dead center BDC being shifted, as a result of the rotation of the eccentric bushing.

As already mentioned, there are further measures with which the cylinder-specific compression ratio ε can be varied within a presently occurring working cycle in order to increase the efficiency of the internal combustion engine. The above method variant reduces the compression ratio ε during the exhaust phase that follows the expansion phase. This measure already serves for the preparation for the subsequent compression phase, which should be performed with the highest possible, or maximum, compression ratio $\varepsilon_{compression}$. The fundamental causal relationship that, with increasing compression ratio ε, the efficiency η likewise increases applies unchanged for the impending compression phase. With regard to the highest possible efficiency of the combustion process, the cylinder fresh charge should therefore be compressed to the greatest possible extent in the compression phase, that is to say the compression ratio $\varepsilon_{compression}$ should be as high as possible. It must nevertheless be taken into consideration that the compression ratio $\varepsilon_{compression}$ in the compression phase is, according to the invention, smaller or lower than the compression ratio $\varepsilon_{expansion}$ in the expansion phase, because other regulating circumstances, such as for example the knocking tendency, must be taken into consideration. In this respect, for the compression, the compression ratio ε must be decreased proceeding from the expansion. The eccentric bushing is accordingly rotated, wherein said rotation preferably is, or constitutes, a continuation of the rotational movement during the expansion phase, advantageously with an equal rotational speed, that is to say angular speed $\Omega_{eccentric}$.

That which has been stated above analogously also applies for the following method variant, in which a further rotation of the eccentric bushing likewise serves for the preparation for the impending compression phase, that is to say the compression of the cylinder fresh charge in the compression phase with the highest or largest possible compression ratio $\varepsilon_{compression}$.

For the reasons stated above, embodiments of the method are also advantageous in which the compression ratio ε is, during an intake phase preceding the compression phase, decreased by rotation of the eccentric bushing relative to the crankshaft throw with the top dead center TDC being maintained, the piston stroke s being decreased, and as a result the bottom dead center BDC being shifted, as a result of the rotation of the eccentric bushing. The two above method variants relate in principle to a 4-stroke internal combustion engine, in which a working cycle comprises an intake phase and an exhaust phase in addition to the expansion phase and the compression phase. The two latter working strokes are omitted in the 2-stroke method or in a 2-stroke internal combustion engine.

Embodiments of the method are advantageous in which the compression ratio ε is, during the compression phase, increased by rotation of the eccentric bushing relative to the crankshaft throw with the top dead center TDC being maintained, the piston stroke s being increased, and as a result the bottom dead center BDC being shifted, as a result of the rotation of the eccentric bushing.

The above method variant increases the compression ratio ε during the compression phase that precedes the expansion phase. This measure already serves for the preparation for the expansion phase, which should be performed with the highest or largest possible compression ratio $\varepsilon_{expansion}$ in order to be able to extract the greatest possible amount of energy from the gases situated in the cylinder. The eccentric bushing is correspondingly rotated, wherein said rotation is preferably in turn a continuation of the preceding rotational movements.

All of the rotational movements of the eccentric bushing take place continuously and are preferably performed with an equal rotational speed, that is to say angular speed $\Omega_{eccentric}$.

Embodiments of the method are basically advantageous in which the rotation of the eccentric bushing is performed continuously. Embodiments of the method are advantageous in which the rotation of the eccentric bushing is performed with a rotational speed $\Omega_{eccentric}$, wherein $\Omega_{eccentric}=0.5\ \Omega_{crankshaft}$. Embodiments of the method may also be advantageous in which the rotation of the eccentric bushing is performed with a rotational speed $\Omega_{eccentric}$, wherein $\Omega_{eccentric}=1.5\ \Omega_{crankshaft}$. Embodiments of the method are advantageous in which the rotation of the eccentric bushing is performed in the same direction with respect to the crankshaft. Embodiments of the method may also be advantageous in which the rotation of the eccentric bushing is performed in the opposite direction with respect to the crankshaft.

The fact that the rotation of the eccentric bushing may in the individual case be performed in the same direction with respect to the crankshaft or in the opposite direction with respect to the crankshaft leads to a certain degree of flexibility in the design of the adjustment mechanism for rotating the eccentric bushing, that is to say of the rotation device.

Embodiments of the method are advantageous in which the rotation of the eccentric bushing is performed in a positively controlled manner using the crankshaft. It is expedient and advantageous to utilize the crankshaft to rotate the eccentric bushing, as a constituent part of the rotation device, because the eccentric bushing has to be rotated relative to the crankshaft, specifically relative to the crankshaft throw. Here, the encircling crankshaft generally serves as drive shaft for the rotation device of the eccentric bushing, for example as a gearing input shaft or as a sun gear of a planetary gear set.

In this context, embodiments of the method are also advantageous in which the rotation of the eccentric bushing is performed using a bushing-specific gearing. A gearing with a fixed transmission ratio i ensures a continuous rotation of the eccentric bushing, in particular a targeted and reproducible rotation. In the present case, the gearing may be arranged in the crankcase or outside the crankcase and may serve for controlling the rotational movement of an eccentric bushing or of multiple eccentric bushings.

Embodiments of the method are advantageous in which the rotation of the eccentric bushing is performed using a bushing-specific gearing which is arranged in the crankcase, the gearing comprising: an internal gear which is mounted in and fixedly with respect to the crankcase and which has an internal toothing; an auxiliary gear which is fixedly connected to the eccentric bushing and which has an external toothing and which is rotatably mounted on the bushing-specific crankshaft throw, and a planet gear which is rotatably mounted on a journal of a planet carrier which is fixedly connected to the crankshaft, the planet gear having an external toothing, which engages with the internal toothing of the internal gear, and an internal toothing, which engages with the external toothing of the auxiliary gear.

The above gearing-like adjustment mechanism for rotating the eccentric bushing has the advantage that the adjustment mechanism participates not in the oscillating movement of the crank mechanism but only in the rotating movement, and does so only to a small extent. The oscillating mass of the crank mechanism is thus not increased.

The gearings arranged in the crankcase ensure a compact construction of the internal combustion engine or of the drive unit as a whole, and the densest possible packaging in the engine bay of a vehicle. Furthermore, the lubrication of the internal combustion engine and/or of the crankshaft with oil can be utilized for the bushing-specific gearing.

The second sub-object on which the invention is based, specifically that of providing an applied-ignition internal combustion engine for carrying out a method of a type described above, is achieved by means of an internal combustion engine having at least two cylinders and having a crank mechanism comprising a crankshaft which is mounted in a crankcase and which rotates at a crankshaft rotational speed $\Omega_{crankshaft}$, in which internal combustion engine: each cylinder has a piston which, during the course of a working cycle, moves along a piston longitudinal axis through a piston stroke s, specifically from a bottom dead center BDC to a top dead center TDC during a compression phase and from the top dead center TDC to the bottom dead center BDC during a subsequent expansion phase; the crankshaft has, for each cylinder, an associated crankshaft throw, the crankshaft throws being arranged spaced apart from one another along the longitudinal axis of the crankshaft; and for each cylinder, a connecting rod is provided which is mounted, at a large connecting rod eye, on the cylinder-specific crankshaft throw using a rotatable eccentric bushing as an intermediate element in order to realize a variable compression ratio ε, and which internal combustion engine is characterized by the fact that, for the variation of the cylinder-specific compression ratio ε of an operating internal combustion engine, for each eccentric bushing, a bushing-specific gearing is provided which is arranged in the crankcase, the gearing comprising: an internal gear which is mounted in and fixedly with respect to the crankcase and which has an internal toothing; an auxiliary gear which is fixedly connected to the eccentric bushing and which has an external toothing and which is rotatably mounted on the bushing-specific crankshaft throw; and a planet gear which is rotatably mounted on a journal of a planet carrier which is fixedly connected to the crankshaft, the planet gear having an external toothing, which engages with the internal toothing of the internal gear, and an internal toothing, which engages with the external toothing of the auxiliary gear.

That which has already been stated with regard to the method according to the invention also applies to the internal combustion engine according to the invention, for which reason reference is generally made at this juncture to the statements made above with regard to the internal combustion engine. The internal combustion engine according to the invention has an adjustment device in the true sense, by means of which the rotation process of the bushing can be influenced in a targeted manner. According to the invention, the rotatable eccentric bushing is not left to its own devices, but rather is rotated in targeted fashion, that is to say is moved or transferred into the respectively presently required position relative to the crankshaft throw, by means of an adjustment mechanism, specifically a planetary gear set, which is kinematically connected to the bushing. Positive control of the bushing, that is to say a controlled rotation of the bushing, is performed.

Each eccentric bushing is rotated, in accordance with the working cycle of the associated cylinder, in order to adapt the compression ratio ε in an efficiency-optimized manner to the present working stroke of the individual cylinder. Embodiments of the applied-ignition internal combustion engine are advantageous in which the gearing (5) is configured with a transmission ratio i=$\Omega_{eccentric}/\Omega_{crankshaft}$, for which the following applies: i=0.5. Embodiments of the applied-ignition internal combustion engine may also be advantageous in which the gearing is configured with a transmission ratio i=$\Omega_{eccentric}/\Omega_{crankshaft}$, for which the following applies: i=1.5.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes combustion chamber 30 and cylinder walls 32 with piston 36 positioned therein and connected to crankshaft 2 via connecting rod 3. Piston 36 reciprocates during a cycle of engine 10 along longitudinal axis 61 of the piston and the engine's compression ratio may be adjusted via compression ratio adjusting device 62. In some examples, compression ratio adjusting device may increase the height of piston 36 or a length of rod 3 to increase the engine compression ratio. In one example, the length of rod 3 or the height of piston 36 is adjusted via the mechanisms described in U.S. Pat. Nos. 6,644,171 and 6,568,357 which are hereby fully incorporated by reference for all purposes.

Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57. Intake poppet valve 52 may be operated by a variable valve activating/deactivating actuator 59, which may be a cam driven valve operator (e.g., as shown in U.S. Pat. Nos. 9,605,603; 7,404,383; and 7,159,551 all of which are hereby fully incorporated by reference for all purposes). Likewise, exhaust poppet valve 54 may be operated by a variable valve activating/deactivating actuator 58, which may a cam driven valve operator (e.g., as shown in U.S. Pat. Nos. 9,605,603; 7,404,383; and 7,159,551 all of which are hereby fully incorporated by reference for all purposes). Intake poppet valve 52 and exhaust poppet valve 54 may be deactivated and held in a closed position preventing flow into and out of cylinder 30 for one or more entire engine cycles (e.g. two engine revolutions), thereby deactivating cylinder 30. Flow of fuel supplied to cylinder 30 may also cease when cylinder 30 is deactivated.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, and fuel rail (not shown). In some examples, the fuel system includes a low pressure fuel pump and a high pressure fuel pump.

Engine air intake system 19 includes intake manifold 44, throttle 62, charge air cooler 163, turbocharger compressor 162, and intake plenum 42. Intake manifold 44 is shown communicating with optional electronic throttle 62 which adjusts a position of throttle plate 64 to control air flow from intake boost chamber 46. Compressor 162 draws air from air intake plenum 42 to supply boost chamber 46. Compressor vane actuator 84 adjusts a position of compressor vanes 29. Exhaust gases spin turbine 164 which is coupled to turbocharger compressor 162 via shaft 161. Compressor speed may be adjusted via adjusting a position of turbine variable vane control actuator 78 or compressor recirculation valve 158.

In alternative examples, a waste gate 79 may replace or be used in addition to turbine variable vane control actuator 78. Turbine variable vane control actuator 78 adjusts a position of variable geometry turbine vanes 166. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 79 or a bypass valve may allow exhaust gases to flow around turbine 164 so as to reduce the amount of energy supplied to the turbine. Compressor recirculation valve 158 allows compressed air at the outlet 15 of compressor 162 to be returned to the inlet 17 of compressor 162. Alternatively, a position of compressor variable vane actuator 78 may be adjusted to change the efficiency of compressor 162. In this way, the efficiency of compressor 162 may be reduced so as to affect the flow of compressor 162 and reduce the possibility of compressor surge. Further, by returning air back to the inlet of compressor 162, work performed on the air may be increased, thereby increasing the temperature of the air. Optional electric machine (e.g., motor) 165 is also shown coupled to shaft 161.

Optional electric machine 165 may rotate compressor 162 when engine 10 is not rotating, when engine 10 is rotating at low speed (e.g., cranking speed such as 250 RPM), when exhaust energy is low to provide additional boost, or on an as desired basis. Air flows into engine 10 in the direction of arrows 5.

Flywheel 97 and ring gear 99 are coupled to crankshaft 2. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 2 during engine cranking. Starter 96 may be directly mounted to the front of the engine or the rear of the engine. In some examples, starter 96 may selectively supply torque to crankshaft 2 via a belt or chain. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, accelerator pedal position, battery SOC, etc.). Battery 8 may supply electrical power to starter 96 and electric machine 165. Controller 12 may monitor battery state of charge.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126. Exhaust flows in the direction of arrow 7.

Exhaust gas recirculation (EGR) may be provided to the engine via high pressure EGR system 83. High pressure EGR system 83 includes valve 80, EGR passage 81, and EGR cooler 85. EGR valve 80 is a valve that closes or allows exhaust gas to flow from upstream of emissions device 70 to a location in the engine air intake system downstream of compressor 162. EGR may be cooled via passing through EGR cooler 85. EGR may also be provided via low pressure EGR system 75. Low pressure EGR system 75 includes EGR passage 77 and EGR valve 76. Low pressure EGR may flow from downstream of emissions device 70 to a location upstream of compressor 162. Low pressure EGR system 75 may include an EGR cooler 74.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 121 coupled to intake manifold 44 (alternatively or in addition sensor 121 may sense intake manifold temperature); boost pressure from pressure sensor 122 exhaust gas oxygen concentration from oxygen sensor 126; an engine position sensor from a Hall effect sensor 118 sensing crankshaft 2 position; a measurement of air mass entering the engine from sensor 120 (e.g., a hot wire air flow meter); and a measurement of throttle position from sensor 58. Barometric pressure, oil pressure, and ambient temperature may also be sensed via sensors 91 for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its present stroke (e.g. when combustion chamber 30 is at its largest volume for the present stroke) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC for the expansion stroke. Crankshaft 2 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2A:
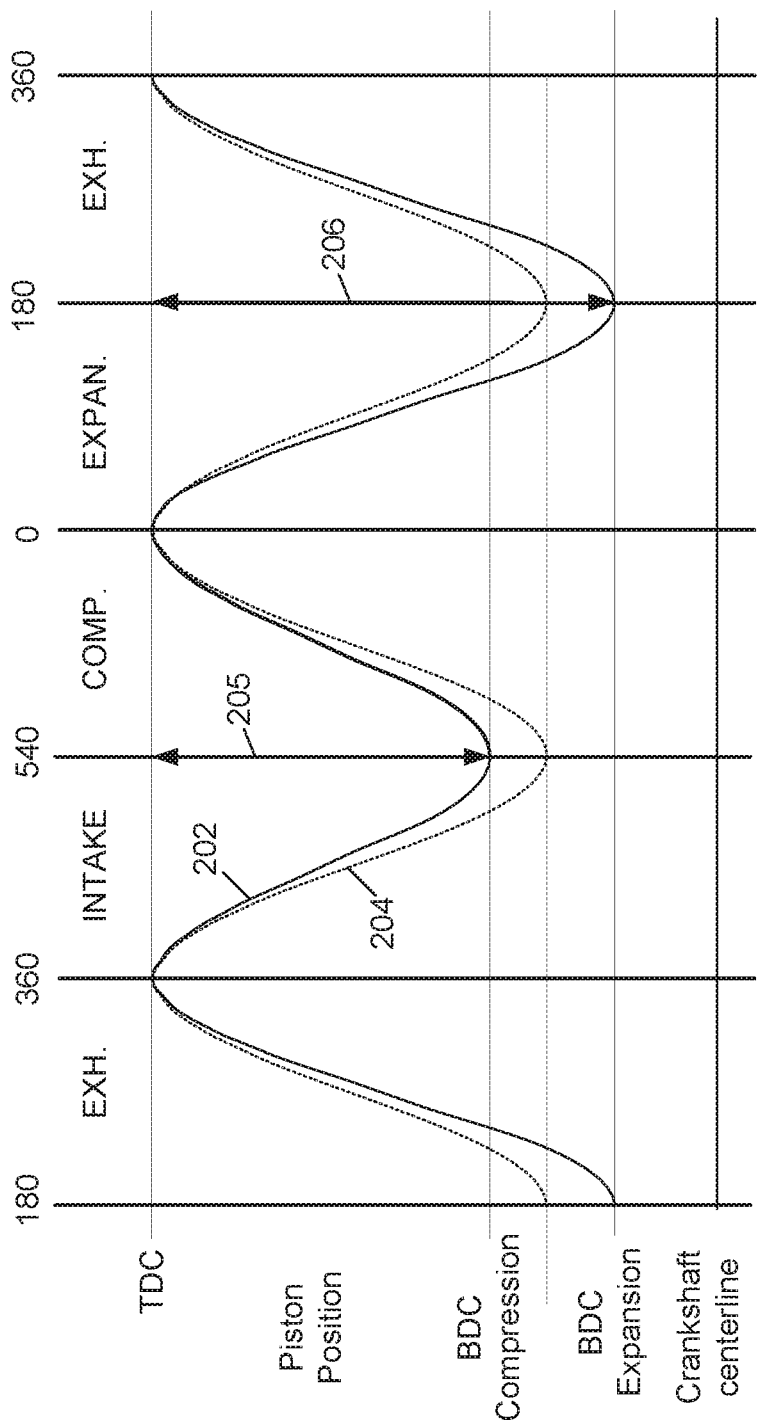
FIG. 2A schematically shows the piston position of a cylinder for a conventional internal combustion engine with constant compression ratio and the piston position of a cylinder for an applied-ignition internal combustion engine with a compression ratio that is variable in accordance with the present invention.

FIG. 2A schematically shows the piston position of a cylinder for a conventional internal combustion engine with constant compression ratio $\varepsilon$ and the piston position of a cylinder for an applied-ignition internal combustion engine with a compression ratio $\varepsilon_{compression}$, $\varepsilon_{expansion}$ that is variable in accordance with the invention. Strokes of the cylinder are indicated in the vertical columns. The dashed line 204 in FIG. 2A indicates the piston position of a cylinder for a conventional internal combustion engine with constant compression ratio $\varepsilon$. The piston oscillates between the top dead center TDC and the bottom dead center BDC. Top dead center piston position is indicated on the left hand side of the plot. Bottom dead center compression stroke for trace 202 is also indicated on the left hand side of the plot. Bottom dead center expansion stroke for trace 202 is also indicated on the left hand side of the plot. The crankshaft centerline position is also indicated along the left hand side of the plot.

The solid line 202 in FIG. 2A shows the piston position of a cylinder of an internal combustion engine in which the compression ratio $\varepsilon$ is varied or adapted over an engine cycle in the manner according to the invention. In the compression phase, the piston moves from a bottom dead center $BDC_{compression}$ to the top dead center TDC. The compression ratio $\varepsilon_{compression}$ is increased already in the compression phase for the subsequent expansion phase, in which the piston moves from the top dead center TDC to a bottom dead center $BDC_{expansion}$ which is shifted as a result of rotation of the eccentric bushing. Leader 205 shows the length of the compression stroke for the present invention. The compression ratio $\varepsilon_{expansion}$ is increased further in the expansion phase in order that the gases situated in the cylinder can expand further and, in the process, perform further work on the piston. In the subsequent two working strokes, the exhaust phase and the intake phase, the compression ratio $\varepsilon$ is decreased further in preparation for the subsequent compression phase. The cycle continues to repeat as the engine continues to rotate (not shown). Thus, the bottom dead center position of the piston may be shifted along the longitudinal axis of the engine cylinder to adjust the cylinder stroke.

It is duly the case also in the method according to the invention that the cylinder fresh charge should be compressed to the greatest possible extent in the compression phase. However, the compression ratio $\varepsilon_{compression}$ of the compression phase is in the present case lower than the compression ratio $\varepsilon_{expansion}$ of the expansion phase. The piston stroke s, that is to say the distance between the top dead center TDC and the bottom dead center $BDC_{compression}$ or $BDC_{expansion}$ is smaller in the compression phase than in the expansion phase. Leader 206 shows the length of the expansion stroke for the present invention.

Figure 2B:
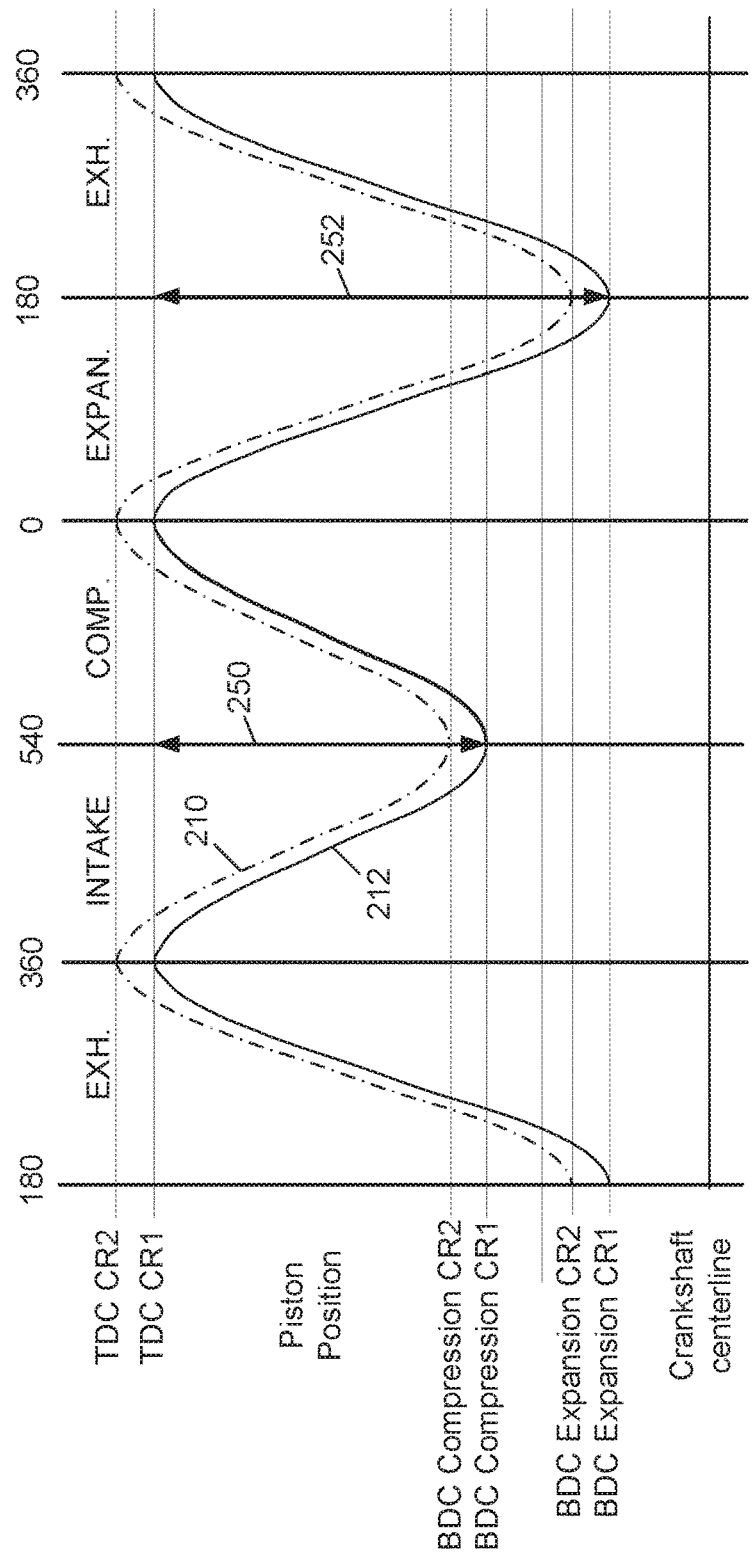
FIG. 2B schematically shows the piston position of a cylinder for an internal combustion engine with a stroke length that changes over a cycle of the engine in accordance with the present invention and the piston position of a cylinder for an internal combustion engine with a compression ratio that is increased and that changes over the cycle of the engine in accordance with the present invention.

Referring now to FIG. 2B, the solid line 212 in FIG. 2B shows the piston position of a cylinder of an internal combustion engine in which the compression ratio $\varepsilon$ is varied or adapted over an engine cycle in the manner according to the invention. This piston position trajectory is the same as the trajectory 202 shown in FIG. 2A. Top dead center piston position for the first compression ratio is indicated on the left hand side of the plot as TDC CR1. Top dead center piston position for the second compression ratio is indicated on the left hand side of the plot as TDC CR2. Bottom dead center compression stroke for trace 212 is also indicated on the left hand side of the plot as BDC compression CR1. Bottom dead center compression stroke for trace 210 is also indicated on the left hand side of the plot as BDC compression CR2. Bottom dead center expansion stroke for trace 212 is also indicated on the left hand side of the plot as BDC expansion CR1. Bottom dead center expansion stroke for trace 210 is also indicated on the left hand side of the plot as BDC expansion CR2. The crankshaft centerline position is also indicated along the left hand side of the plot.

In the compression phase, the piston moves from a bottom dead center $BDC_{compression}$ to the top dead center TDC. The compression ratio $\varepsilon_{compression}$ is increased already in the compression phase for the subsequent expansion phase, in which the piston moves from the top dead center TDC to a bottom dead center $BDC_{expansion}$ which is shifted as a result of rotation of the eccentric bushing. Leader 250 shows the length of the compression stroke for the present invention. The compression ratio $\varepsilon_{expansion}$ is increased further in the expansion phase in order that the gases situated in the cylinder can expand further and, in the process, perform further work on the piston. In the subsequent two working strokes, the exhaust phase and the intake phase, the compression ratio $\varepsilon$ is decreased further in preparation for the subsequent compression phase. The cycle continues to repeat as the engine continues to rotate (not shown). Thus, the bottom dead center position of the piston may be shifted along the longitudinal axis of the engine cylinder to adjust the cylinder stroke.

The cylinder fresh charge should be compressed to the greatest possible extent in the compression phase. However, the compression ratio $\varepsilon_{compression}$ of the compression phase is in the present case lower than the compression ratio $\varepsilon_{expansion}$ of the expansion phase. The piston stroke s, that is to say the distance between the top dead center TDC and the bottom dead center $BDC_{compression}$ or $BDC_{expansion}$ is smaller in the compression phase than in the expansion phase. Leader 252 shows the length of the expansion stroke for the present invention.

The dash-dot line 210 in FIG. 2B shows the piston position of a cylinder of an internal combustion engine in which the compression ratio $\varepsilon$ of the compression phase is increased and varied or adapted over an engine cycle in the manner according to the invention. The piston position trajectory of line 210 shows that the compression ratio of the engine is increased during the compression stroke of the engine. Further, since the increased compression stroke is produced in part by increasing rod length or piston height, the piston position is higher relative to the crankshaft center line after the cylinder compression ratio has been increased via a rod or piston height adjusting mechanism. By increasing the compression ratio during the compression stroke, engine efficiency may be improved without increasing engine knock susceptibility when the engine is combusting higher octane fuels (e.g., alcohol fuels). Thus, the compression ratio of the compression phase of the cylinder may be selectively increased and the stroke of the cylinder may be changed during an engine cycle to accommodate higher octane fuels.

FIG. 3A schematically shows the change in position of the eccentric bushing 4 with respect to the crankshaft throw 3a in the case of a revolving crankshaft for the expansion phase and the exhaust phase. The rotation of the eccentric bushing 4 is performed in the same direction with respect to the revolving crankshaft or the crankshaft throw 3a, specifically in each case clockwise, wherein the rotational speed $\Omega_{eccentric}$ of the eccentric bushing 4 is half the rotational speed $\Omega_{crankshaft}$ of the crankshaft. The following applies: $\Omega_{eccentric} = 0.5\ \Omega_{crankshaft}$. The change in position of the eccentric bushing 4 with respect to the crankshaft throw 2a is illustrated for eight crankshaft positions, which are spaced apart from one another in each case by 90° CA (degrees crank angle). The eight crankshaft positions are numbered successively.

Proceeding from a piston situated at top dead center TDC (position 1), as the crankshaft rotates, the eccentric bushing 4 changes its position relative to the crankshaft throw 2a by rotation during the expansion phase (position 1 to position 3), such that the bottom dead center $BDC_{expansion}$ is shifted (position 3). As a result, the piston stroke s and consequently the compression ratio $\varepsilon$ are increased. The expansion phase (position 1 to position 3) is followed by the exhaust phase (position 3 to position 5) and the intake phase (position 5 to position 7). Both in the exhaust phase and in the intake phase, the compression ratio $\varepsilon$ is decreased by virtue of the piston stroke s being decreased by rotation of the eccentric bushing 4 relative to the crankshaft throw 2a, and consequently the bottom dead center $BDC_{compression}$ being shifted. This serves for preparation for the compression phase (position 7 to position 1), the compression ratio $\varepsilon_{compression}$ of which is lower than the compression ratio $\varepsilon_{expansion}$ of the expansion phase (position 1 to position 3).

During the compression phase (position 7 to position 1), the compression ratio $\varepsilon$ is increased again, with the top dead center TDC being maintained, by virtue of the piston stroke s being increased by rotation of the eccentric bushing 4 relative to the crankshaft throw 2a, and consequently the bottom dead center $BDC_{expansion}$ being shifted. The increase of the compression ratio $\varepsilon$ during the compression phase (position 7 to position 1) serves for preparation for the expansion phase (position 1 to position 3) that follows the compression phase. All of the rotational movements of the eccentric bushing are performed continuously with an equal rotational speed, that is to say angular speed $\Omega_{eccentric}$.

FIG. 3B schematically shows the change in position of the eccentric bushing 4 with respect to the crankshaft throw 2a as the crankshaft rotates, for the intake phase (position 5 to position 7) and the compression phase (position 7 to position 1).

FIG. 4A schematically shows, in a side view and partially in section, the crank mechanism 1 of a first embodiment of the applied-ignition internal combustion engine. Crank mechanism 1 may include multiple sections that are similar to the illustrated section. FIG. 4B shows said crank mechanism 1 in a side view rotated through 90° in relation to FIG. 4A and likewise partially in section. The crankshaft longitudinal axis is indicated by line 402. The crankshaft vertical axis is indicated by line 406. The crankshaft horizontal axis or crankshaft centerline height is indicated by line 404. The crank mechanism 1 comprises a crankshaft 2 and a connecting rod 3 mounted on the crankshaft 2, connecting rod 3 is coupled to piston 36 of FIG. 1 or a similar piston of the engine, wherein the crankshaft 2 is mounted in the crankcase of an internal combustion engine and the connecting rod 3 is mounted on a crankshaft throw 2a of the crankshaft 2, that is to say a connecting rod journal 2a. The connecting rod journal 2a is mounted in crank webs 2b of the crankshaft 2. A balancing weight 2c that is provided serves to balance the inertial forces of the rotating masses.

The connecting rod 3 has a small connecting rod eye and a large connecting rod eye 3a. The small connecting rod eye serves for the articulated connection of the connecting rod 3 to the piston by means of piston pins. At the large connecting rod eye 3a, the connecting rod 3 is rotatably mounted on a connecting rod journal 2a of the crankshaft 2 using an eccentric bushing 4 as an intermediate element. For assembly purposes, the crankshaft-side connecting rod bearing realized by the large connecting rod eye 3a, and the eccentric bushing 4, are of two-part form in order that they can be assembled on the connecting rod journal 2a of the crankshaft 2 (not illustrated).

To realize a variable compression ratio ε, the eccentric bushing 4 is mounted rotatably in the large connecting rod eye 3a. The piston stroke s is varied by rotation of the eccentric bushing 4 relative to the crankshaft throw 2a, with the top dead center TDC being maintained and the bottom dead center BDC being shifted. As a result, the compression ratio ε is increased or decreased as a result of the rotation of the eccentric bushing 4.

In the present case, the rotation of the eccentric bushing 4 is performed in the same direction with respect to the revolving crankshaft 2, specifically clockwise as indicated by the arrows, wherein the eccentric bushing 4 rotates with a rotational speed $\Omega_{eccentric}$ which is one and a half times the rotational speed $\Omega_{crankshaft}$ of the crankshaft 2. The following applies: $\Omega_{eccentric}=1.5\ \Omega_{crankshaft}$. A gearing 5 serves as adjustment mechanism or rotation device for the bushing 4. Here, a dedicated bushing-specific gearing 5 for each bushing 4 is arranged in the crankcase. A bushing-specific gearing 5 comprises an internal gear 6, which is mounted in and fixedly with respect to the crankcase and which has an internal toothing 6a, and an auxiliary gear 7, which is connected rotationally conjointly to the eccentric bushing 4 and which is mounted rotatably on the bushing-specific crankshaft throw 2a using a bearing 7b and which has an external toothing 7a. A planet gear 8, which is mounted rotatably, using a bearing 8c, on a journal of a planet carrier 9 which is connected fixedly to the crankshaft 2 serves for the kinematic coupling of the auxiliary gear 7 to the internal gear 6. Here, an external toothing 8a of the planet gear 8 engages with the internal toothing 6a of the internal gear 6, whereas an internal toothing 8b of the planet gear 8 engages with the external toothing 7a of the auxiliary gear 7. In the present case, the planet gear 8 rotates counterclockwise, that is to say in the opposite direction with respect to the revolving crankshaft 2 and in the opposite direction with respect to the rotating eccentric bushing 4, as indicated by an arrow, specifically at three times the crankshaft rotational speed $\Omega_{crankshaft}$. The following applies: $\Omega_{planet\ gear}=3\ \Omega_{crankshaft}$.

Thus, the system provides for an applied-ignition internal combustion engine having at least two cylinders and having a crank mechanism (1) comprising a crankshaft (2) which is mounted in a crankcase and which rotates at a crankshaft rotational speed $\Omega_{crankshaft}$, in which internal combustion engine: each cylinder has a piston which, during the course of a working cycle, moves along a piston longitudinal axis through a piston stroke s, specifically from a bottom dead center BDC to a top dead center TDC during a compression phase and from the top dead center TDC to the bottom dead center BDC during a subsequent expansion phase; the crankshaft (2) has, for each cylinder, an associated crankshaft throw (2a), the crankshaft throws (2a) being arranged spaced apart from one another along the longitudinal axis of the crankshaft (2); and for each cylinder, a connecting rod (3) is provided which is mounted, at a large connecting rod eye (3a), on the cylinder-specific crankshaft throw (2a) using a rotatable eccentric bushing (4) as an intermediate element in order to realize a variable compression ratio ε, wherein, for the variation of the cylinder-specific compression ratio ε of an operating internal combustion engine, for each eccentric bushing (4), a bushing-specific gearing (5) is provided which is arranged in the crankcase, the gearing (5) comprising: an internal gear (6) which is mounted in and fixedly with respect to the crankcase and which has an internal toothing (6a); an auxiliary gear (7) which is fixedly connected to the eccentric bushing (4) and which has an external toothing (7a) and which is rotatably mounted on the bushing-specific crankshaft throw (2a); and a planet gear (8) which is rotatably mounted on a journal (9a) of a planet carrier (9) which is fixedly connected to the crankshaft (2), the planet gear (8) having an external toothing (8a), which engages with the internal toothing (6a) of the internal gear (6), and an internal toothing (8b), which engages with the external toothing (7a) of the auxiliary gear (7). The applied-ignition internal combustion engine includes wherein the gearing (5) is configured with a transmission ratio $i=\Omega_{eccentric}/\Omega_{crankshaft}$, for which the following applies: i=0.5. The applied-ignition internal combustion engine includes wherein the gearing (5) is configured with a transmission ratio $i=\Omega_{eccentric}/\Omega_{crankshaft}$, for which the following applies: i=1.5.

Figure 5A:
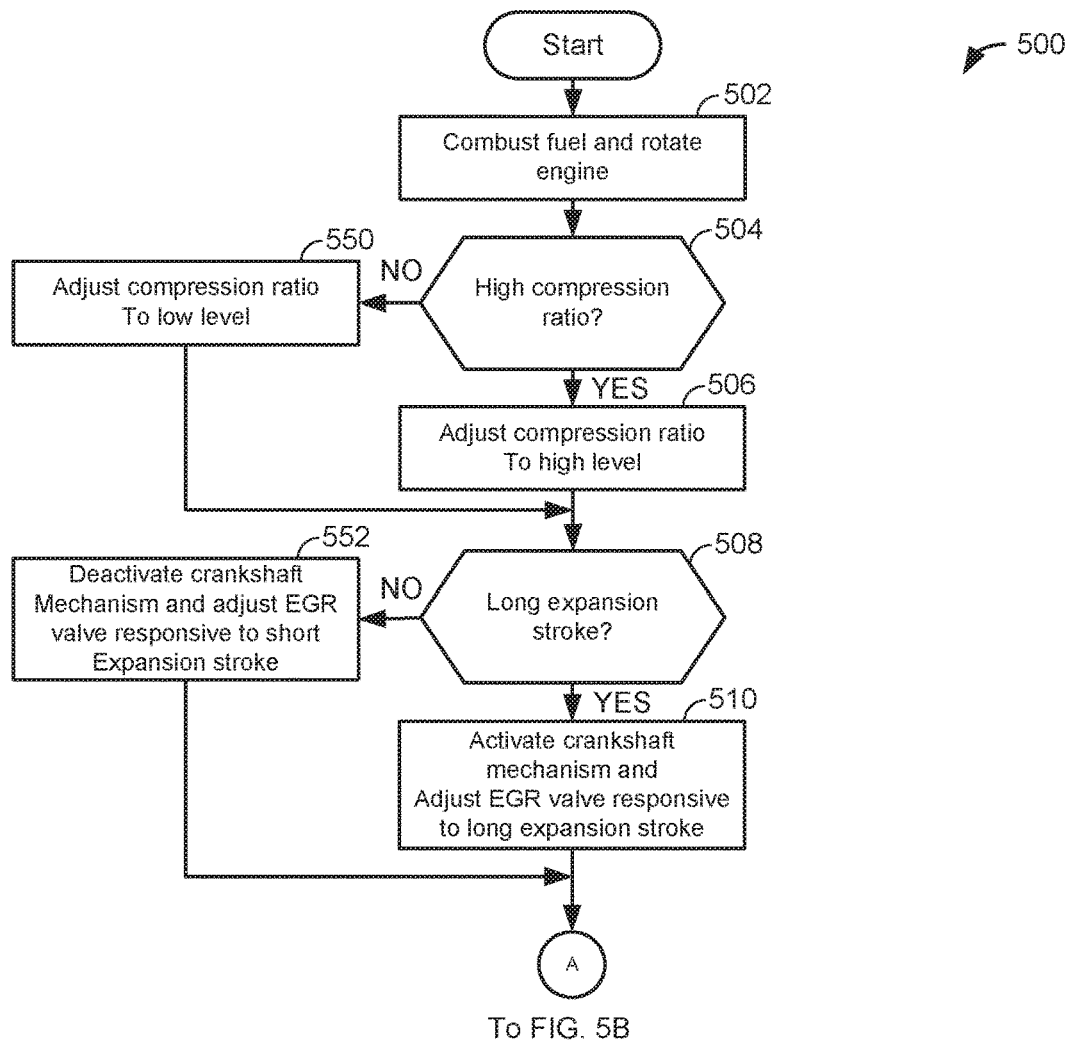
FIGS. 5A and 5B show methods for operating an engine according to the present invention.
Figure 5B:
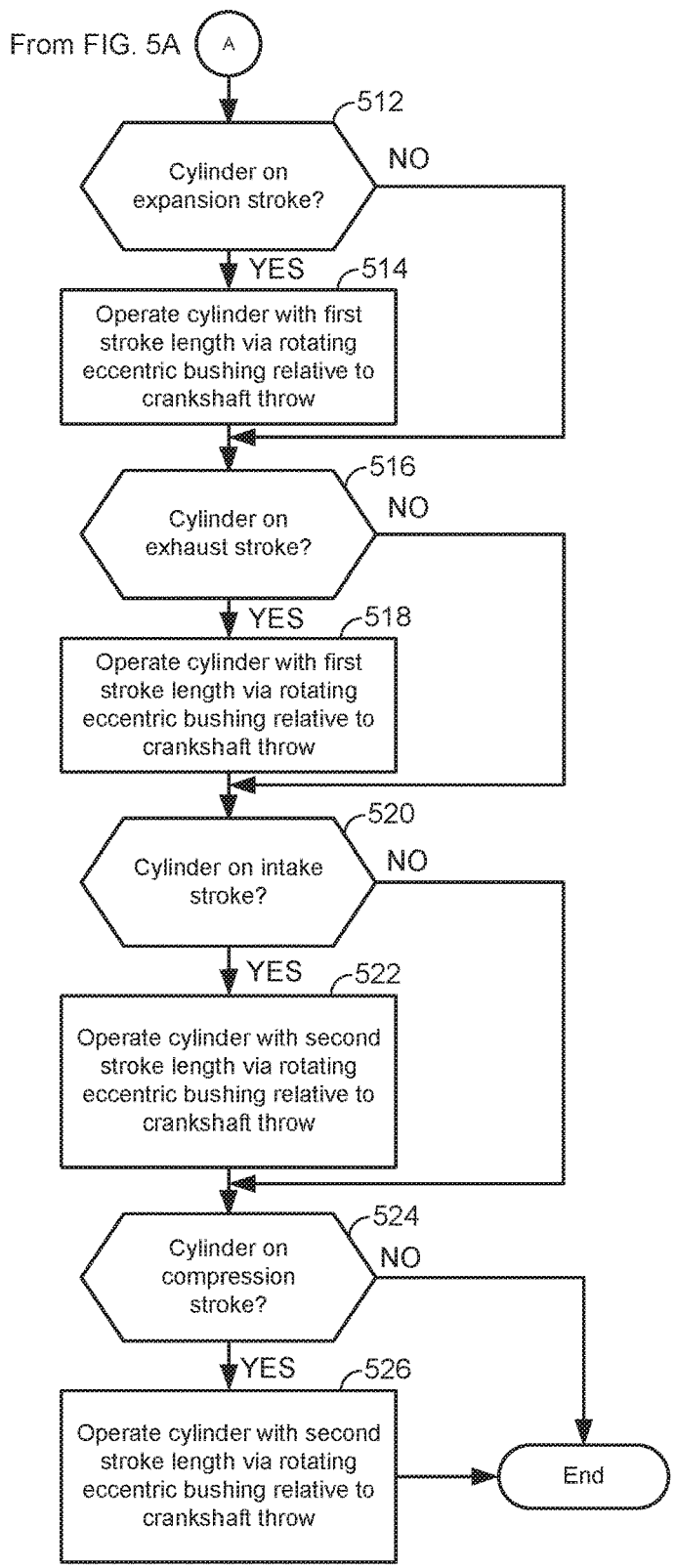

Referring now to FIGS. 5A and 5B, a method for operating an engine is shown. In particular, a flowchart of a method for operating an internal combustion engine that includes a cylinder stroke adjusting mechanism (e.g., a crankshaft mechanism) is shown. The method of FIGS. 5A and 5B may be performed via operating an engine and combusting fuel via executable instructions in non-transitory memory in a controller such as shown in FIG. 1 and a crankshaft mechanism as shown in FIGS. 4A and 4B. The method of FIGS. 5A and 5B may be incorporated into and may cooperate with the systems of FIGS. 1-4B. The method of FIGS. 5A and 5B may be performed for each cylinder of an engine and several versions of the method of FIGS. 5A and 5B may be executed simultaneously. Further, portions of the method of FIGS. 5A and 5B may be executed via a controller as shown in FIG. 1, while other portions of the method may be performed via the mechanism shown in FIGS. 4A and 4B.

At 502, the engine is rotated and it is combusting fuel. The engine may be rotated via a starter during starting. After the engine is started it rotates via torque generated via combustion. Fuel and spark are provided to the engine's cylinders via a controller, an ignition system, and fuel injectors while the engine is operating. Method 500 proceeds to 504.

At 504, method 500 judges if the present cylinder being controlled is to be operated with a compression phase (e.g., compression stroke) high compression ratio. In one example, method 500 may judge to operate the engine with the compression phase high compression ratio when the alcohol concentration in fuel supplied to the engine exceeds a threshold concentration (e.g., 20% of fuel injected during a cylinder cycle). However, if the alcohol concentration in fuel supplied to the engine is less than the threshold concentration, then the cylinder may be operated in its compression phase with a low compression ratio. If method 500 judges that the present cylinder is to operate in its compression phase with a high compression ratio, then the answer is yes and method 500 proceeds to 506. Otherwise, the answer is no and method 500 proceeds to 550.

At 506, method 500 adjusts the cylinder's compression ratio to provide a high compression ratio during the cylinder's compression phase. The compression ratio in the compression phase may be increased via increasing a length of rod 3 or a height of piston 36. Method 500 proceeds to 508.

At 550, method 500 adjusts the cylinder's compression ratio to provide a low compression ratio during the cylinder's compression phase. The compression ratio in the compression phase may be decreased via decreasing a length of rod 3 or a height of piston 36. Method 500 proceeds to 508.

At 508, method 500 judges if the present cylinder being controlled is to be operated with a long expansion stroke (e.g., the trajectory of trace 202 in FIG. 2A). In one example, method 500 may judge to operate the engine with a long expansion stroke if the desired EGR flow is low or if intake manifold pressure is low such that EGR may be drawn into the engine even if exhaust pressure is low. However, if the desired EGR flow is high or if the engine manifold pressure is high, then the engine may be operated with a short expansion stroke (e.g., the trajectory of trace 204 in FIG. 2A). If method 500 judges that the present cylinder is to operate with the long expansion stroke, then the answer is yes and method 500 proceeds to 510. Otherwise, the answer is no and method 500 proceeds to 552.

At 510, method 500 adjusts the cylinder's expansion stroke to provide a long stroke during the cylinder's expansion phase (e.g., an expansion stroke that is longer than a compression stroke of the same cylinder as shown by trace 202 in FIG. 2A). The expansion stroke in the expansion compression phase may be increased via the mechanism shown in FIGS. 4A and 4B. Further, method 500 may adjust a position of an EGR valve responsive to the increase in the expansion stroke length. For example, the EGR valve may be opened farther for a desired EGR flow rate X for a particular engine speed and load condition when the expansion stroke is long as compared to the EGR valve position for the same desired EGR flow rate X for the same engine speed and load condition when the expansion stroke is short. The larger EGR valve opening amount may compensate for a lower exhaust pressure that may be produced via the longer expansion stroke. Method 500 proceeds to 512.

At 552, method 500 adjusts the cylinder's expansion stroke to provide a short stroke during the cylinder's expansion phase (e.g., an expansion stroke that is the same length as the compression stroke of the same cylinder as shown by trace 204 of FIG. 2A). The expansion stroke in the expansion compression phase may be decreased via changing a gear of the mechanism shown in FIGS. 4A and 4B or via making alternative adjustments to a mechanism that is similar to the mechanism shown in FIGS. 4A and 4B. In addition, method 500 may adjust a position of an EGR valve responsive to a decrease in the expansion stroke length. For example, the EGR valve may be opened less for a desired EGR flow rate X for a particular engine speed and load condition when the expansion stroke is short as compared to the EGR valve position for the same desired EGR flow rate X for the same engine speed and load condition when the expansion stroke is long. The smaller EGR valve opening amount may compensate for a higher exhaust pressure that may be produced via the shorter expansion stroke. Method 500 proceeds to 512.

At 512, method 500 judges if the present cylinder being controlled is on its expansion stroke. Method 500 may judge that the present cylinder is on its expansion stroke based on input from a crank position sensor. Further, the crankshaft mechanism described herein provides a unique piston trajectory profile during the present cylinder's expansion stroke that is mechanically set via an eccentric bushing and a crankshaft throw. If method 500 judges that the present cylinder is on its expansion stroke, the answer is yes and method 500 proceeds to 514. Otherwise, the answer is no and method 500 proceeds to 516.

At 514, method 500 operates the present cylinder with a first stroke length. The first stroke length is provided via an eccentric bushing relative to crankshaft throw. The bushing may be rotated as shown in FIGS. 3A and 3B via the crankshaft mechanism shown in FIGS. 4A and 4B. Method 500 proceeds to 516.

At 516, method 500 judges if the present cylinder being controlled is on its exhaust stroke. Method 500 may judge that the present cylinder is on its exhaust stroke based on input from a crank position sensor. Further, the crankshaft mechanism described herein provides a unique piston trajectory profile during the present cylinder's exhaust stroke that is mechanically set via an eccentric bushing and a crankshaft throw. If method 500 judges that the present cylinder is on its exhaust stroke, the answer is yes and method 500 proceeds to 518. Otherwise, the answer is no and method 500 proceeds to 520.

At 518, method 500 operates the present cylinder with a first stroke length. The first stroke length is provided via an eccentric bushing relative to crankshaft throw. The bushing may be rotated as shown in FIGS. 3A and 3B via the crankshaft mechanism shown in FIGS. 4A and 4B. Method 500 proceeds to 520.

At 520, method 500 judges if the present cylinder being controlled is on its intake stroke. Method 500 may judge that the present cylinder is on its intake stroke based on input from a crank position sensor. Further, the crankshaft mechanism described herein provides a unique piston trajectory profile during the present cylinder's intake stroke that is mechanically set via an eccentric bushing and a crankshaft throw. If method 500 judges that the present cylinder is on its intake stroke, the answer is yes and method 500 proceeds to 522. Otherwise, the answer is no and method 500 proceeds to 524.

At 522, method 500 operates the present cylinder with a second stroke length. The second stroke length is provided via an eccentric bushing relative to crankshaft throw. The bushing may be rotated as shown in FIGS. 3A and 3B via the crankshaft mechanism shown in FIGS. 4A and 4B. Method 500 proceeds to 524.

At 524, method 500 judges if the present cylinder being controlled is on its compression stroke. Method 500 may judge that the present cylinder is on its compression stroke based on input from a crank position sensor. Further, the crankshaft mechanism described herein provides a unique piston trajectory profile during the present cylinder's compression stroke that is mechanically set via an eccentric bushing and a crankshaft throw. If method 500 judges that the present cylinder is on its compression stroke, the answer is yes and method 500 proceeds to 526. Otherwise, the answer is no and method 500 proceeds to exit.

At 526, method 500 operates the present cylinder with a second stroke length. The second stroke length is provided via an eccentric bushing relative to crankshaft throw, and the second stroke length is less than the first stroke length. The bushing may be rotated as shown in FIGS. 3A and 3B via the crankshaft mechanism shown in FIGS. 4A and 4B. Method 500 proceeds to exit.

Thus, method 500 adjusts stroke length of a cylinder to provide two different length strokes during a cycle of the cylinder. In particular, during expansion and exhaust strokes of a cylinder during a cylinder cycle, the stroke length is a first stoke length. During intake and compression strokes of the cylinder during the cylinder cycle, the stroke length is a second stroke length, the second stroke length less than the first stroke length.

The method of FIGS. 5A and 5B provides for 13. A method for operating an engine, comprising: during a cycle of a cylinder, adjusting a stroke of the cylinder via a crank mechanism to generate a first stroke length of the cylinder during an expansion stroke of the cylinder; during the cycle of the cylinder, adjusting the stroke of the cylinder via the crank mechanism to generate a second stroke length of the cylinder during a compression stroke of the cylinder; and selectively increasing a compression ratio of the cylinder responsive to a fuel octane. The method further comprises adjusting a position of an EGR valve responsive to the first stroke length and the second stroke length. The method includes where the compression ratio of the cylinder is increased in response to the fuel octane increasing.

The method of FIGS. 5A and 5B provides for a method for operating an engine, comprising: during a cycle of a cylinder, adjusting a stroke of the cylinder via a crank mechanism to generate a first stroke length of the cylinder during an expansion stroke of the cylinder; and during the cycle of the cylinder, adjusting the stroke of the cylinder via the crank mechanism to generate a second stroke length of the cylinder during a compression stroke of the cylinder. The method includes wherein the first stroke length is greater than the second stroke length. The method includes wherein the first stroke length is adjusted via changing a bottom dead center position of a piston of the cylinder. The method includes wherein a top dead center position of the piston is not altered during the cylinder cycle. The method includes wherein an exhaust stroke of the cylinder is equal to the first stroke length.

Figure 6:
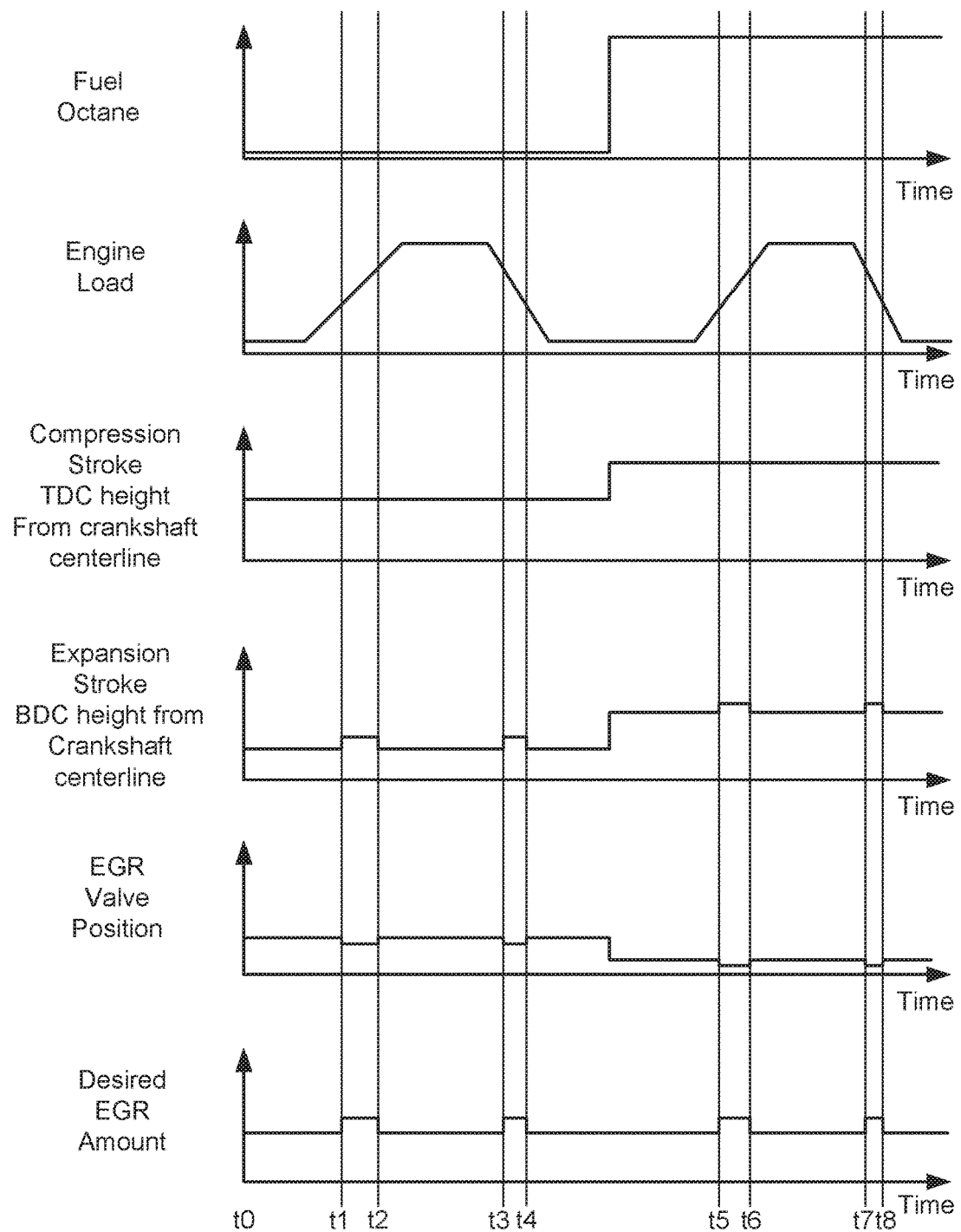
FIG. 6 shows a timing sequence for operating an engine according to the method of FIGS. 5A and 5B.

Referring now to FIG. 6, an example engine operating sequence according to the method of FIGS. 5A and 5B is shown. FIG. 6 shows six plots and the plots are aligned in time and occur at the same time. Vertical lines at times t0-t8 represent times of interest during the sequence.

The first plot from the top of FIG. 6 is a plot of fuel octane versus time. The vertical axis represents an octane number of fuel that is supplied to the engine and the octane number increases in the direction of the vertical axis arrow. The horizontal axis represents time and time increases from the left side of the figure to the right side of the figure.

The second plot from the top of FIG. 6 is a plot of engine load versus time. The vertical axis represents engine load and engine load increases in the direction of the vertical axis arrow. The horizontal axis represents time and time increases from the left side of the figure to the right side of the figure.

The third plot from the top of FIG. 6 is a plot of compression stroke TDC height relative to the crankshaft centerline versus time. The vertical axis represents compression stroke TDC height relative to the crankshaft centerline and the compression stroke TDC height relative to the crankshaft centerline increases in the direction of the vertical axis arrow. A higher compression stroke TDC height indicates a higher compression ratio and a lower cylinder volume at TDC compression stroke. The horizontal axis represents time and time increases from the left side of the figure to the right side of the figure.

The fourth plot from the top of FIG. 6 is a plot of expansion stroke BDC height relative to the crankshaft centerline versus time. The vertical axis represents expansion stroke BDC height relative to the crankshaft centerline and the expansion stroke BDC height relative to the crankshaft centerline increases in the direction of the vertical axis arrow. A higher expansion stroke BDC height indicates a shorter stroke and a smaller cylinder volume at BDC expansion stroke. The horizontal axis represents time and time increases from the left side of the figure to the right side of the figure.

The fifth plot from the top of FIG. 6 is a plot of EGR valve position versus time. The vertical axis represents EGR valve position and the EGR valve opening amount increases in the direction of the vertical axis arrow. The horizontal axis represents time and time increases from the left side of the figure to the right side of the figure.

The sixth plot from the top of FIG. 6 is a plot of desired EGR amount versus time. The vertical axis represents desired EGR amount and the desired EGR amount increases in the direction of the vertical axis arrow. The horizontal axis represents time and time increases from the left side of the figure to the right side of the figure. The desired EGR amount is held at a constant value to illustrate the expansion stroke length on EGR flow.

At time t0, the engine is operating and combusting (not shown) a lower octane fuel. The engine load is low and the compression ratio is low. The expansion stroke length relative to or measured from the crankshaft centerline is at a middle level. The EGR valve is opened a small amount and the desired EGR valve is at a middle level. Between time t0 and time t1, the engine load is increased and the remaining conditions are unchanged.

At time t1, the desired EGR amount is increased and so the expansion stroke BDC height relative to the crankshaft centerline is adjusted upward toward TDC. By adjusting the expansion stroke BDC height, additional exhaust pressure may be provided to increase the EGR flow rate. The EGR valve is closed a small amount to compensate for the higher exhaust pressure. The engine continues to operate on the lower octane fuel and the engine load continues to increase. The compression stroke TDC height is unchanged.

At time t2, the desired EGR amount is decreased and so the expansion stroke BDC height relative to the crankshaft centerline is adjusted downward away from TDC. By adjusting the expansion stroke BDC height lower, less exhaust pressure may be provided to decrease the EGR flow rate and work performed in the exhaust stroke may be increased. The EGR valve is opened a small amount to compensate for the lower exhaust pressure. The engine continues to operate on the lower octane fuel and the engine load continues to increase. The compression stroke TDC height is unchanged. Between time t2 and time t3, the engine load increases and then decreases.

At time t3, the desired EGR amount is increased again so the expansion stroke BDC height relative to the crankshaft centerline is adjusted upward toward TDC. By adjusting the expansion stroke BDC height, additional exhaust pressure may be provided to increase the EGR flow rate. The EGR valve is closed a small amount to compensate for the higher exhaust pressure. The engine continues to operate on the lower octane fuel and the engine load continues to decrease. The compression stroke TDC height is unchanged.

At time t4, the desired EGR amount is decreased and so the expansion stroke BDC height relative to the crankshaft centerline is adjusted downward away from TDC. By adjusting the expansion stroke BDC height lower, less exhaust pressure may be provided to decrease the EGR flow rate and work performed in the exhaust stroke may be increased. The EGR valve is opened a small amount to compensate for the lower exhaust pressure. The engine continues to operate on the lower octane fuel and the engine load continues to increase. The compression stroke TDC height is unchanged.

Between time t4 and time t5, the fuel octane is increased and the compression stroke TDC height from the crankshaft centerline is increased, thereby increasing the compression ratio of the cylinder. Since the compression ratio is increased via increasing piston height or rod length, the expansion stroke BDC height from the crankshaft centerline is also increased. The higher expansion stroke BDC piston height increases exhaust pressure so the EGR valve is partially closed to maintain a same EGR flow rate to the cylinder. The engine load begins to increase near time t5.

At time t5, the desired EGR amount is increased and so the expansion stroke BDC height relative to the crankshaft centerline is adjusted upward toward TDC. By adjusting the expansion stroke BDC height, additional exhaust pressure may be provided to increase the EGR flow rate. The EGR valve is closed a small amount to compensate for the higher exhaust pressure. The engine continues to operate on the lower octane fuel and the engine load continues to increase. The compression stroke TDC height is unchanged. Because the compression phase compression ratio has been increased by increasing the compression stroke TDC height from the crankshaft centerline, the expansion stroke height from the crankshaft centerline at time t5 is higher than the expansion stroke height from the crankshaft centerline at time t1.

At time t6, the desired EGR amount is decreased and so the expansion stroke BDC height relative to the crankshaft centerline is adjusted downward away from TDC. By adjusting the expansion stroke BDC height lower, less exhaust pressure may be provided to decrease the EGR flow rate and work performed in the exhaust stroke may be increased. The EGR valve is opened a small amount to compensate for the lower exhaust pressure. The engine continues to operate on the lower octane fuel and the engine load continues to increase. The compression stroke TDC height is unchanged. Between time t6 and time t7, the engine load increases and then decreases.

At time t7, the desired EGR amount is increased again so the expansion stroke BDC height relative to the crankshaft centerline is adjusted upward toward TDC. By adjusting the expansion stroke BDC height, additional exhaust pressure may be provided to increase the EGR flow rate. The EGR valve is closed a small amount to compensate for the higher exhaust pressure. The engine continues to operate on the lower octane fuel and the engine load continues to decrease. The compression stroke TDC height is unchanged.

At time t8, the desired EGR amount is decreased and so the expansion stroke BDC height relative to the crankshaft centerline is adjusted downward away from TDC. By adjusting the expansion stroke BDC height lower, less exhaust pressure may be provided to decrease the EGR flow rate and work performed in the exhaust stroke may be increased. The EGR valve is opened a small amount to compensate for the lower exhaust pressure. The engine continues to operate on the lower octane fuel and the engine load continues to increase. The compression stroke TDC height is unchanged.

In this way, the compression phase compression ratio may be increased and the expansion phase stroke length may be increased to increase engine work. If higher EGR flow rates are requested, the expansion phase stroke length may be reduced. Further, other combinations and sub-combinations of compression ratio adjustments and expansion ratio stroke length may be provided.

REFERENCE DESIGNATIONS

1 Crank mechanism
2 Crankshaft
2a Crankshaft throw, connecting rod journal
2b Crank web
2c Balancing weight
3 Connecting rod
3a Large connecting rod eye
4 Eccentric bushing, bushing
5 Gearing, planetary gear set
6 Internal gear
6a Internal toothing of the internal gear
7 Auxiliary gear
7a External toothing of the auxiliary gear
7b Bearing of the auxiliary gear
8 Planet gear
8a External toothing of the planet gear
8b Internal toothing of the planet gear
8c Bearing of the planet gear
9 Planet carrier
9a Journal of the planet carrier
$\varepsilon$ Compression ratio without eccentric bushing
$\varepsilon_{compression}$ Compression ratio of the compression
$\varepsilon_{expansion}$ Compression ratio of the expansion
$\eta$ Efficiency
TDC Top dead center
s Stroke
$BDC_{compression}$ Bottom dead center of the compression
$BDC_{expansion}$ Bottom dead center of the expansion
$V_c$ Compression volume
$V_h$ Swept volume of a cylinder
$\Omega_{crankshaft}$ Rotational speed of the crankshaft
$\Omega_{eccentric}$ Rotational speed of the eccentric bushing
$\Omega_{planet\ gear}$ Rotational speed of the planet gear Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for varying a cylinder-specific compression ratio E of an operating applied-ignition internal combustion engine having at least two cylinders and having a crank mechanism comprising a crankshaft which is mounted in a crankcase and which rotates at a crankshaft rotational speed $\Omega_{crankshaft}$, in which internal combustion engine:
   each cylinder has a piston which, during a course of a working cycle, moves along a piston longitudinal axis through a piston stroke s, specifically from a bottom dead center BDC to a top dead center TDC during a compression phase and from the top dead center TDC to the bottom dead center BDC during a subsequent expansion phase;
   the crankshaft has, for each cylinder, an associated crankshaft throw, the associated crankshaft throw being arranged spaced apart from other crankshaft throws along a longitudinal axis of the crankshaft; and
   for each cylinder, a connecting rod is provided which is mounted, at a large connecting rod eye, on the associated crankshaft throw using a rotatable eccentric bushing as an intermediate element in order to realize the cylinder-specific compression ratio ε, wherein the cylinder-specific compression ratio ε is, during the subsequent expansion phase, increased by rotation of the rotatable eccentric bushing relative to the associated crankshaft throw with the top dead center TDC being maintained, the piston stroke s being increased, and as a result the bottom dead center BDC being shifted, as a result of the rotation of the rotatable eccentric bushing, wherein the rotation of the rotatable eccentric bushing is performed with a rotational speed $\Omega_{eccentric}$, wherein $\Omega_{eccentric}=1.5\ \Omega_{crankshaft}$, wherein the rotation of the rotatable eccentric bushing is performed in a same direction with respect to the crankshaft, wherein the rotation of the rotatable eccentric bushing is performed in a positively controlled manner using the crankshaft, wherein the rotation of the rotatable eccentric bushing is performed using a bushing-specific gearing, and wherein the rotation of the rotatable eccentric bushing is performed using the bushing-specific gearing which is arranged in the crankcase, the bushing-specific gearing comprising:
   an internal gear which is mounted in and fixedly with respect to the crankcase and which has an internal toothing;
   an auxiliary gear which is fixedly connected to the rotatable eccentric bushing and which has an external toothing and which is rotatably mounted on the associated crankshaft throw; and
   a planet gear which is rotatably mounted on a journal of a planet carrier which is fixedly connected to the crankshaft, the planet gear having an external toothing, which engages with the internal toothing of the internal gear, and an internal toothing, which engages with the external toothing of the auxiliary gear.

2. The method of claim 1, wherein the cylinder-specific compression ratio ε is, during an exhaust phase following the subsequent expansion phase, decreased by rotation of the rotatable eccentric bushing relative to the associated crankshaft throw with the top dead center TDC being maintained, the piston stroke s being decreased, and as a result the bottom dead center BDC being shifted, as a result of the rotation of the rotatable eccentric bushing.

3. The method of claim 2, wherein the cylinder specific compression ratio ε is, during an intake phase preceding the compression phase, decreased by rotation of the rotatable eccentric bushing relative to the associated crankshaft throw with the top dead center TDC being maintained, the piston stroke s being decreased, and as a result the bottom dead center BDC being shifted, as a result of the rotation of the rotatable eccentric bushing.

4. The method of claim 3, wherein the cylinder-specific compression ratio ε is, during the compression phase, increased by rotation of the rotatable eccentric bushing relative to the associated crankshaft throw with the top dead center TDC being maintained, the piston stroke s being increased, and as a result the bottom dead center BDC being shifted, as a result of the rotation of the rotatable eccentric bushing.

5. The method of claim 4, wherein the rotation of the rotatable eccentric bushing is performed continuously.

6. A method for operating an engine, comprising:
   during a cycle of a cylinder, adjusting a stroke of the cylinder via a crank mechanism to generate a first stroke length of the cylinder during an expansion stroke of the cylinder;
   during the cycle of the cylinder, adjusting the stroke of the cylinder via the crank mechanism to generate a second stroke length of the cylinder during a compression stroke of the cylinder;
   selectively increasing a compression phase compression ratio of the cylinder responsive to a fuel octane; and
   adjusting a position of an exhaust recirculation (EGR) valve responsive to the first stroke length and the second stroke length, wherein the EGR valve is positioned along an EGR passage that is external to the cylinder, the EGR passage coupling an exhaust manifold to an intake manifold.

7. The method of claim 6, where the compression phase compression ratio of the cylinder is increased in response to the fuel octane increasing.

8. A method for varying a cylinder-specific compression ratio ε of an operating applied-ignition internal combustion engine having at least two cylinders and having a crank mechanism comprising a crankshaft which is mounted in a crankcase and which rotates at a crankshaft rotational speed $\Omega_{crankshaft}$, in which internal combustion engine:
   each cylinder has a piston which, during a course of a working cycle, moves along a piston longitudinal axis through a piston stroke s, specifically from a bottom dead center BDC to a top dead center TDC during a compression phase and from the top dead center TDC to the bottom dead center BDC during a subsequent expansion phase;

the crankshaft has, for each cylinder, an associated crankshaft throw, the associated crankshaft throw being arranged spaced apart from other crankshaft throws along a longitudinal axis of the crankshaft; and for each cylinder, a connecting rod is provided which is mounted, at a large connecting rod eye, on the associated crankshaft throw using a rotatable eccentric bushing as an intermediate element in order to realize the cylinder-specific compression ratio ε, wherein the cylinder-specific compression ratio ε is, during the subsequent expansion phase, increased by a rotation of the rotatable eccentric bushing relative to the associated crankshaft throw with the top dead center TDC being maintained, the piston stroke s being increased, and as a result the bottom dead center BDC being shifted, as a result of the rotation of the rotatable eccentric bushing, and wherein the rotation of the rotatable eccentric bushing is performed using a bushing-specific gearing which is arranged in the crankcase, the bushing-specific gearing comprising:

an internal gear which is mounted in and fixedly with respect to the crankcase and which has an internal toothing;

an auxiliary gear which is fixedly connected to the rotatable eccentric bushing and which has an external toothing and which is rotatably mounted on the associated crankshaft throw; and a planet gear which is rotatably mounted on a journal of a planet carrier which is fixedly connected to the crankshaft, the planet gear having an external toothing, which engages with the internal toothing of the internal gear, and an internal toothing, which engages with the external toothing of the auxiliary gear.

9. The method of claim 8, wherein the rotation of the rotatable eccentric bushing is performed with a rotational speed $\Omega_{eccentric}$, wherein $\Omega_{eccentric}=0.5\ \Omega_{crankshaft}$.

* * * * *